(12) United States Patent
Kim et al.

(10) Patent No.: US 12,200,535 B2
(45) Date of Patent: Jan. 14, 2025

(54) METHOD AND APPARATUS FOR OPERATING PDCP LAYER PROCESSING QOS IN WIRELESS COMMUNICATION SYSTEM

(71) Applicant: Samsung Electronics Co., Ltd., Suwon-si (KR)

(72) Inventors: Donggun Kim, Seoul (KR); Seungri Jin, Suwon-si (KR); Soenghun Kim, Suwon-si (KR); Youngwoo Kwak, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/713,536

(22) Filed: Apr. 5, 2022

(65) Prior Publication Data

US 2022/0232412 A1 Jul. 21, 2022

Related U.S. Application Data

(63) Continuation of application No. 16/826,893, filed on Mar. 23, 2020, now Pat. No. 11,510,091, which is a
(Continued)

(30) Foreign Application Priority Data

Feb. 7, 2017 (KR) .......................... 10-2017-0016885

(51) Int. Cl.
*H04W 28/02* (2009.01)
*H04L 5/00* (2006.01)
(Continued)

(52) U.S. Cl.
CPC ......... *H04W 28/0268* (2013.01); *H04L 5/001* (2013.01); *H04L 5/0035* (2013.01);
(Continued)

(58) Field of Classification Search
CPC ... H04W 28/0268; H04W 4/70; H04W 28/10; H04W 28/0252; H04W 40/244;
(Continued)

(56) References Cited

U.S. PATENT DOCUMENTS

2007/0242703 A1* 10/2007 Pelletier ................ H04W 28/06
370/395.52
2013/0201824 A1 8/2013 Venkatachalam et al.
(Continued)

FOREIGN PATENT DOCUMENTS

CN 103858467 A 6/2014
CN 104115422 A 10/2014
(Continued)

OTHER PUBLICATIONS

Heejeong Cho, Protocol Header design for individual activation of multiple reflective QOS types, Feb. 1, 2017, U.S. Appl. No. 62/453,467 of US 2019/0349804, pp. 1-35 (Year: 2017).*
(Continued)

*Primary Examiner* — Steven Hieu D Nguyen
(74) *Attorney, Agent, or Firm* — Jefferson IP Law, LLP

(57) ABSTRACT

A method for configuring a flow-based quality of service (QoS), configuring a bearer-based QoS, and introducing a new layer above a packet data convergence protocol (PDCP) layer in order to process the flow-based QoS are provided. An operation of the PDCP layer to support the new layer is also provided. The disclosure relates to a communication method and system for converging a fifth generation (5G) communication system for supporting higher data rates beyond a fourth generation (4G) system with an Internet of things (IoT) technology. The disclosure may be applied to intelligent services based on the 5G communication technology and the IoT-related technology, such as smart home, smart building, smart city, smart car or connected car, health
(Continued)

care, digital education, smart retail, security and safety services.

16 Claims, 28 Drawing Sheets

Related U.S. Application Data continuation of application No. 15/890,656, filed on Feb. 7, 2018, now Pat. No. 10,638,355.

(51) Int. Cl.
    *H04L 69/321*      (2022.01)
    *H04W 4/70*      (2018.01)
    *H04W 28/10*      (2009.01)

(52) U.S. Cl.
    CPC .......... *H04L 5/0048* (2013.01); *H04L 5/0078* (2013.01); *H04L 5/0096* (2013.01); *H04L 69/321* (2013.01); *H04W 4/70* (2018.02); *H04W 28/10* (2013.01); *H04L 5/0023* (2013.01)

(58) Field of Classification Search
    CPC ..... H04L 5/001; H04L 5/0035; H04L 5/0048; H04L 5/0078; H04L 5/0096; H04L 69/321; H04L 5/0023; H04L 69/22; H04B 7/2612
    See application file for complete search history.

(56) References Cited

U.S. PATENT DOCUMENTS

| | | | |
|---|---|---|---|
| 2014/0029458 A1 | 1/2014 | Ye | |
| 2014/0169320 A1* | 6/2014 | Yi | H04L 1/1896 370/329 |
| 2014/0219115 A1 | 8/2014 | Etemad et al. | |
| 2017/0311311 A1 | 10/2017 | Frenne et al. | |
| 2018/0034525 A1 | 2/2018 | Park et al. | |
| 2018/0098241 A1* | 4/2018 | Callard | H04W 92/10 |
| 2018/0098346 A1 | 4/2018 | Liu et al. | |
| 2018/0102817 A1 | 4/2018 | Park et al. | |
| 2018/0115357 A1 | 4/2018 | Park et al. | |
| 2018/0123654 A1 | 5/2018 | Park et al. | |
| 2018/0175983 A1 | 6/2018 | Yum et al. | |
| 2018/0183770 A1* | 6/2018 | Wu | H04L 9/32 |
| 2018/0227793 A1 | 8/2018 | Kim et al. | |
| 2018/0241523 A1 | 8/2018 | Noh et al. | |
| 2018/0375560 A1 | 12/2018 | Wei | |
| 2019/0349804 A1* | 11/2019 | Cho | H04W 28/0268 |
| 2021/0058818 A1* | 2/2021 | Zhang | H04W 28/065 |

FOREIGN PATENT DOCUMENTS

| | | | |
|---|---|---|---|
| WO | 2015/020508 A1 | 2/2015 | |
| WO | 2016/126099 A1 | 8/2016 | |
| WO | 2016/163842 A1 | 10/2016 | |
| WO | 2018/107029 A1 | 6/2018 | |

OTHER PUBLICATIONS

Heejeong Cho, Protocol Header design for individual activation of multiple reflective QOS types, Feb. 2017, U.S. Appl. No. 62/453,467 of US 2019/0349804, pp. 1-35 (Year: 2017).*
A New Protocol Layer for QoS Flow to DRB Mapping, Jan. 2017, R2-170008, 3GPP, pp. 1-5 (Year: 2017).*
Indian Office Action dated Jan. 11, 2023, issued in Indian Patent Application No. 202238022482.
Extended European Search Report dated Jul. 12, 2022, issued in a counterpart European Application No. 22166158.0.
U.S. Notice of Allowability dated Jul. 15, 2022, issued by the U.S. Patent and Trademark Office, U.S. Appl. No. 16/826,893.
Chinese Office Action dated Aug. 29, 2022, issued in a counterpart Chinese Application No. 201880010480.6.
Samsung; NR QOS—impact to RAN User Piane Protocoi architecture; 3GPP TSG-RAN WG2 Meeting #96bis; R2-1700029; Jan. 17, 2017, Spokane, USA.
MediaTek Inc., ASUSTek; Remaining issues with reflective QoS for NR; 3GPP TSG-RAN WG2 NR; Tdoc R2-1700552; Jan. 17, 2017, Spokane, USA.
Huawei et al., 'Independent and joint control of CSI-RS transmission and CSI reporting for NR MIMO', R1-1611236, 3GPP TSG RAN WG1 Meeting #87, Reno, USA. Published on Nov. 5, 2016.
Huawei et al., 'Independent and joint control of CSI-RS transmission and CSI reporting for NR MIMO', R1-1701681, 3GPP TSG RAN WG1 #88 Meeting, Athens, Greece. Published on Feb. 6, 2017.
Huawei et al., 'Independent and joint control of CSI-RS transmission and CSI reporting for NR MIMO', R1-1700056, 3GPP TSG RAN WG1 NR Ad Hoc Meeting, Spokane, USA. Published on Jan. 9, 2017.
ETRI, 'Design of NR synchronization signals', R1-1700576, 3GPP TSG RAN WG1 AH_NR Meeting Spokane, USA. Published on Jan. 10, 2017.
NTT DOCOMO, 'CSI-RS Design for NR', R1-1610070, 3GPP TSG RAN WG1 Meeting #86bis, Lisbon, Portugal. Published on Oct. 1, 2016.
International Search Report dated May 29, 2018, Issued in International Application No. PCT/KR2018/001669.
Extended European Search Report dated Jul. 11, 2019, issued in a counterpart European application No. 18751275.1-1213.
ERICSSON: "On Dynamic Signalling for Aperiodic and Semi-Persistent CSI-RS", 3GPP Draft; R1-1700761 On Dynamic Signaling for Aperiodic and Semi-Persistent CSI-RS, 3rd Generation Partnership Project (3GPP), Mobile Competence Centre; 650, Route Des Lucioles ; F-06921 Sophia-Ant, vol. RAN WGI, No. XP051208285; Jan. 16, 2017, Spokane, WA, USA.
Nokia et al: "On the CSI-RS configurations for NR CSI acquisition", 3GPP Draft; R1-1701101, 3rd Generation Partnership Project (3GPP), Mobile Competence Centre ; 650, Route Des Lucioles ; F-06921 Sophia-Anti Polis Cedex; France, vol. RAN WGI, No. XP051208615; Jan. 16, 2017, Spokane, USA.
European Office Action dated Jan. 25, 2024, issued in European Patent Application No. 22166158.0.
Indian Hearing Notice dated Feb. 9, 2024, issued in Indian Patent Application No. 201937024933.

* cited by examiner

FIG. 2G
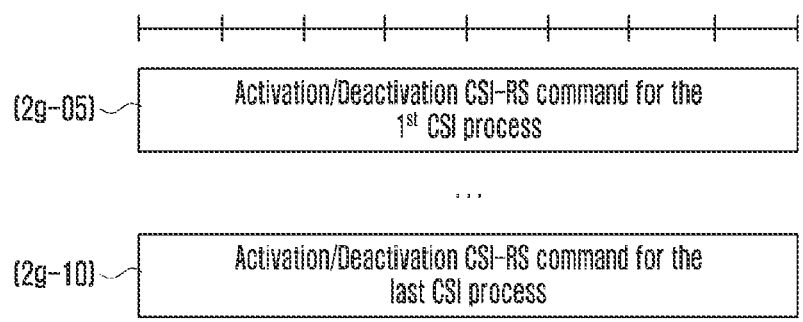
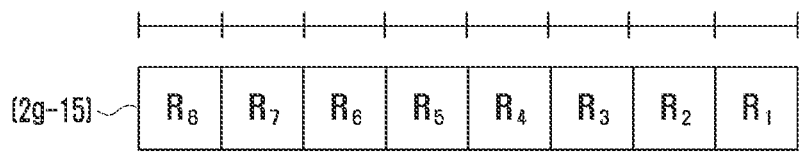

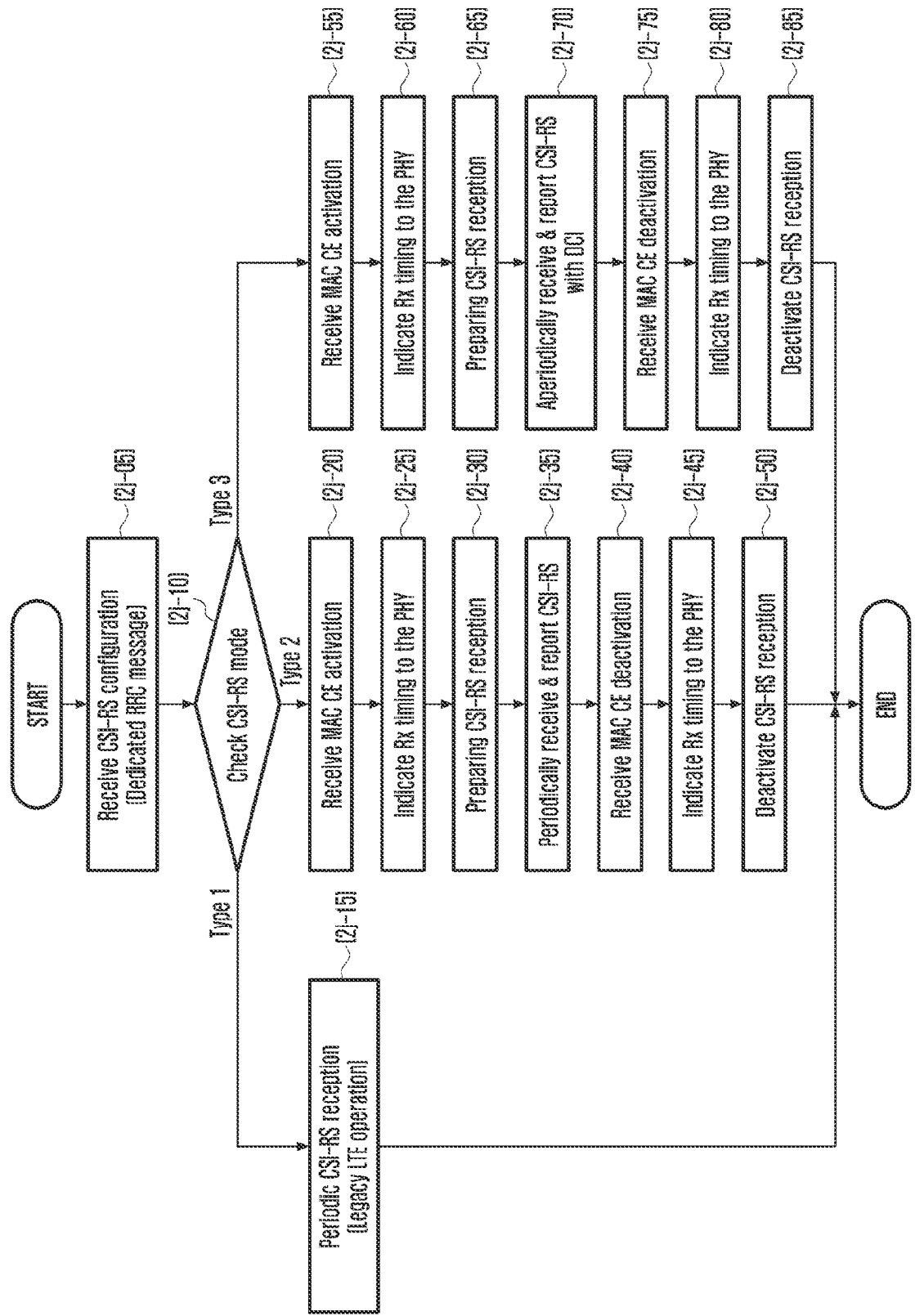

FIG. 3

| CSI-RS config | CSI-IM config | CQI report config | Etc |
|---|---|---|---|
| • No. antenna ports<br><br>• Resource config<br>  • Time and frequency position in a subframe<br><br>• Subframe config<br>  • Periodicity and subframe offset<br><br>• Qcl-CRS-info (QCL Type B)<br>  • CRS information for CoMP | • Resource config<br>  • Time and frequency position in a subframe<br><br>• Subframe config<br>  • Periodicity and subframe offset | • Periodic<br>  • Mode, resource, periodicity, offset...<br><br>• Aperiodic<br>  • Mode..<br><br>• PMI/RI report<br><br>• RI reference CSI process<br><br>• SubframePattern | • $P_c$<br><br>• Codebook subset restriction |

METHOD AND APPARATUS FOR OPERATING PDCP LAYER PROCESSING QOS IN WIRELESS COMMUNICATION SYSTEM

CROSS-REFERENCE TO RELATED APPLICATION(S)

This application is a continuation application of prior application Ser. No. 16/826,893, filed on Mar. 23, 2020, which is a continuation application of prior application Ser. No. 15/890,656, filed on Feb. 7, 2018, which has issued as U.S. Pat. No. 10,638,355 on Apr. 28, 2020, which was based on and claimed priority under 35 U.S.C. § 119(a) of a Korean patent application number 10-2017-0016885, filed on Feb. 7, 2017, in the Korean Intellectual Property Office, the disclosure of which is incorporated by reference herein in its entirety.

TECHNICAL FIELD

The disclosure relates to a method and an apparatus for a packet data convergence protocol (PDCP) layer to process a quality of service (QoS) in a next-generation mobile communication system.

BACKGROUND

In order to meet the demand for wireless data traffic that is on an increasing trend after commercialization of fourth generation (4G) communication systems, efforts have been made to develop improved fifth generation (5G) or pre-5G communication system. For this reason, the 5G or pre-5G communication system is also called a beyond 4G network communication system or a post long-term evolution (LTE) system.

In order to achieve high data rate, implementation of a 5G communication system in an ultrahigh frequency (mmWave) band (e.g., like 60 GHz band) has been considered. In order to mitigate a path loss of radio waves and to increase a transfer distance of the radio waves in the ultrahigh frequency band, technologies of beamforming, massive multiple input multiple output (MIMO), full dimensional MIMO (FD-MIMO), array antennas, analog beam-forming, and large scale antennas for the 5G communication system have been discussed.

Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation.

In addition, in the 5G system, hybrid frequency shift keying (FSK) and quadrature amplitude modulation (QAM) modulation (FQAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

On the other hand, the Internet, which is a human centered connectivity network where humans generate and consume information, is now evolving to the Internet of things (IoT) network where distributed entities, such as things, exchange and process information. The Internet of everything (IoE), which is a combination of the IoT technology and big data processing technology through connection with a cloud server, has emerged. As technology elements, such as sensing technology, wired/wireless communication and network infrastructure, service interface technology, and security technology, have been demanded for IoT implementation, a sensor network for machine-to-machine connection, machine-to-machine (M2M) communication, machine type communication (MTC), and so forth have been recently researched. Such an IoT environment may provide intelligent Internet technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between the existing information technology (IT) and various industries.

Accordingly, various attempts have been made to apply the 5G communication system to IoT networks. For example, technologies of sensor network, M2M communication, and MTC have been implemented by techniques for beam-forming, MIMO, and array antennas, which correspond to the 5G communication technology. As the big data processing technology as described above, application of a cloud RAN would be an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

At present, in a case of applying a method for configuring a bearer-based quality of service (QoS) as in a long-term evolution (LTE) system, a network manages a group of several flows with the same QoS. Accordingly, it is not possible for a core network end and an access network end to perform more minute QoS adjustments.

Aspects of the disclosure are to address at least the above-mentioned problems and/or disadvantages and to provide at least the advantages described below. Accordingly, an aspect of the disclosure is to provide a method for configuring a flow-based QoS in addition to the method for configuring a bearer-based QoS, and introduces a new layer above a packet data convergence protocol (PDCP) layer in order to process the flow-based QoS. Further, the disclosure proposes an operation of the PDCP layer to support the new layer.

Another aspect of the disclosure is to provide an efficient system in a mobile communication system, and a method in which a base station determines a new method for transmitting a channel state information reference signal (CSI-RS) and a terminal receives the CSI-RS for a CSI-RS operation.

In accordance with an aspect of the disclosure, a method by a transmitter side is provided. The method includes a PDCP layer receiving, from a higher layer, a PDCP service data unit (SDU) having a header attached thereto, performing ciphering of the PDCP SDU without the header, and transmitting a PDCP protocol data unit (PDU) to a lower layer.

In accordance with another aspect of the disclosure, a transmitter side is provided. The transmitter side includes a transceiver configured to transmit and receive a signal, and a controller configured to control a PDCP layer receive, from a higher layer, a PDCP SDU having a header attached thereto, perform ciphering of the PDCP SDU without the header, and transmit a PDCP PDU to a lower layer.

In accordance with another aspect of the disclosure, a method by a terminal is provided. The method includes receiving, from a base station, a message indicating an activation or a deactivation of a preconfigured CSI-RS resource, and activating or deactivating a reception of a CSI-RS from the base station based on the message.

In accordance with another aspect of the disclosure, a terminal is provided. The terminal includes a transceiver configured to transmit and receive a signal, and a controller configured to receive, from a base station, a message indicating an activation or a deactivation of a preconfigured CSI-RS resource, and activate or deactivate a reception of a CSI-RS from the base station based on the message.

In accordance with another aspect of the disclosure, a method by a base station is provided. The method includes transmitting, to a terminal, a first message configuring a CSI-RS resource and transmitting, to the terminal, a second message indicating an activation or a deactivation of the configured CSI-RS resource, wherein the terminal activates or deactivates a reception of a CSI-RS based on the second message.

In accordance with another aspect of the disclosure, a base station is provided. The base station includes a transceiver configured to transmit and receive a signal and a controller configured to transmit, to a terminal, a first message configuring a CSI-RS resource, and transmit, to the terminal, a second message indicating an activation or a deactivation of the configured CSI-RS resource, wherein the terminal activates or deactivates a reception of a CSI-RS based on the second message.

In accordance with another aspect of the disclosure, a method for configuring a flow-based QoS is provided in addition to a method for configuring a bearer-based QoS, and a new layer is introduced above a PDCP layer in order to process the flow-based QoS. Further, an operation of the PDCP layer is proposed to support the new layer, and thus the flow-based QoS can be efficiently processed.

Further, according to the aspects of the disclosure, in a mobile communication system, activation/deactivation of a CSI-RS is performed through a medium access control (MAC) control signal for a more adaptive CSI-RS usage rather than a periodic CSI-RS reception and usage according to an existing radio resource control (RRC) configuration.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2G is a diagram explaining a second method for a MAC control signal indicating activation/deactivation of CSI-RS resources proposed according to an embodiment of the disclosure;

FIG. 2H is a diagram explaining the whole operation in a multi-shot CSI-RS mode according to an embodiment of the disclosure;

FIG. 2J is a diagram explaining the whole terminal operation for CSI-RS activation/deactivation using a MAC control element (CE) proposed according to an embodiment of the disclosure;

FIG. 3 is a diagram illustrating an RRC field making CSI-RS configuration.

Throughout the drawings, it should be noted that like reference numbers are used to depict the same or similar elements, features, and structures.

DETAILED DESCRIPTION

Figure 1A:
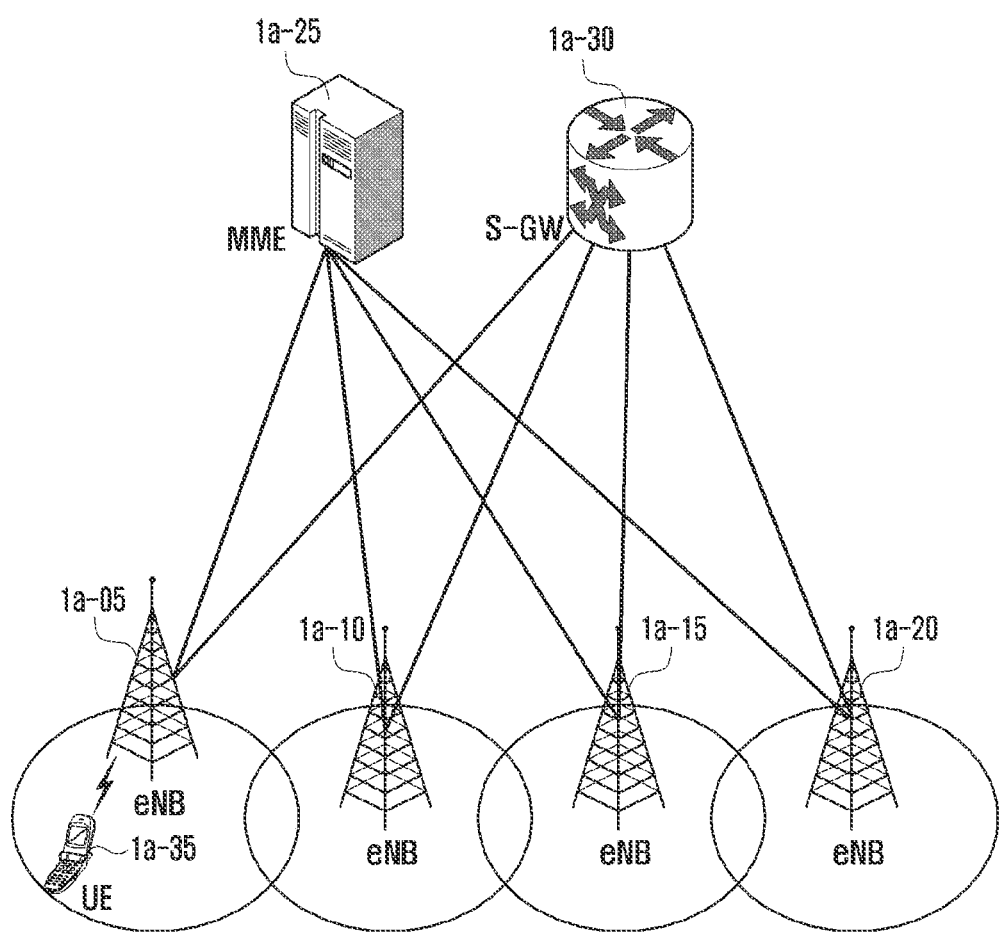
FIG. 1A is a diagram illustrating the structure of a long-term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Further, in explaining embodiments of the disclosure in detail, although an advanced evolved-universal terrestrial radio access (E-UTRA) (or called long-term evolution-advanced (LTE-A)) supporting carrier aggregation will be the main subject, the primary subject matter of the disclosure can be applied to other communication systems having similar technical backgrounds and channel types with slight modifications that do not greatly deviate from the scope of the disclosure, and this will be able to be done by the judgement of those skilled in the art to which the disclosure pertains. For example, the primary subject matter of the disclosure can be applied even to a multicarrier high speed packet access (HSPA) supporting the carrier aggregation.

In explaining embodiments of the disclosure, explanation of technical contents which are well known in the art to which the disclosure pertains and are not directly related to the disclosure will be omitted. This is to transfer the subject matter of the disclosure more clearly without obscuring the same through omission of unnecessary explanations.

For the same reason, in the accompanying drawings, sizes and relative sizes of some constituent elements may be exaggerated, omitted, or briefly illustrated. Further, sizes of the respective constituent elements do not completely reflect the actual sizes thereof. In the drawings, the same drawing reference numerals are used for the same or corresponding elements across various figures.

The aspects and features of the disclosure and methods for achieving the aspects and features will be apparent by referring to the embodiments to be described in detail with reference to the accompanying drawings. However, the disclosure is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~unit", as used in an embodiment, means, but is not limited to, a software or hardware component, such as field-programmable gate array (FPGA) or application-specific integrated circuit (ASIC), which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more central processing units (CPUs) in a device or a security multimedia card.

Hereinafter, the operation principle of the disclosure will be described in detail with reference to the accompanying drawings. In describing the disclosure, related well-known functions or configurations incorporated herein are not described in detail in the case where it is determined that they obscure the subject matter of the disclosure in unnecessary detail. Further, terms to be described later are terms defined in consideration of their functions in the disclosure, but may differ depending on intentions of a user and an operator or customs. Accordingly, they should be defined based on the contents of the whole description of the disclosure.

In describing the disclosure, related well-known functions or configurations incorporated herein are not described in detail in the case where it is determined that they obscure the subject matter of the disclosure in unnecessary detail. Hereinafter, embodiments of the disclosure will be described with reference to the accompanying drawings.

Hereinafter, terms for identifying a connection node, terms for calling network entities, terms for calling an interface between network entities, and terms for calling various pieces of identification information, as used in the following description, are exemplified for convenience in explanation. Accordingly, the disclosure is not limited to the terms to be described later, but other terms for calling subjects having equal technical meanings may be used.

Hereinafter, for convenience in explanation, terms and titles that are defined in the $3^{rd}$ generation partnership project long term evolution (3GPP LTE) standards are used in the disclosure. However, the disclosure is not limited by the terms and titles, but can be equally applied to systems following other standards, such as $5^{th}$ generation (5G) and new radio (NR) systems.

First Embodiment

FIG. 1A is a diagram illustrating the structure of an LTE system according to an embodiment of the disclosure.

Referring to FIG. 1A, as illustrated, a radio access network (RAN) of an LTE system is composed of evolved node Bs ("eNBs", "node Bs", or "base stations") 1a-05, 1a-10, 1a-15, and 1a-20, a mobility management entity (MME) 1a-25, and a serving-gateway (S-GW) 1a-30. User equipment ("UE" or "terminal") 1a-35 accesses to an external network through the eNBs 1a-05, 1a-10, 1a-15, and 1a-20 and the S-GW 1a-30.

In FIG. 1A, the eNB 1a-05, 1a-10, 1a-15, or 1a-20 corresponds to an existing node B of a universal mobile telecommunications system (UMTS) system. The eNB is connected to the UE 1a-35 on a radio channel, and plays a more complicated role than that of the existing node B. In the LTE system, since all user traffics including a real-time service, such as a voice over internet protocol (VoIP) through an internet protocol, are serviced on shared channels, devices performing scheduling through summarization of state information, such as a buffer state, an available transmission power state, and a channel state of each UE, are necessary, and the eNBs 1a-05, 1a-10, 1a-15, and 1a-20 correspond to such scheduling devices. In general, one eNB controls a plurality of cells. For example, in order to implement a transmission speed of 100 Mbps, the LTE system uses, for example, orthogonal frequency division multiplexing (OFDM) in a bandwidth of 20 MHz as a radio access technology. Further, the LTE system adopts an adaptive modulation & coding (AMC) scheme that determines a modulation scheme and a channel coding rate to match the channel state of the terminal. The S-GW 1a-30 is a device that provides a data bearer, and generates or removes the data bearer under the control of the MME 1a-25. The MME is a device that takes charge of not only mobility management of the terminal but also various kinds of control functions, and is connected to the plurality of eNBs.

Figure 1B:
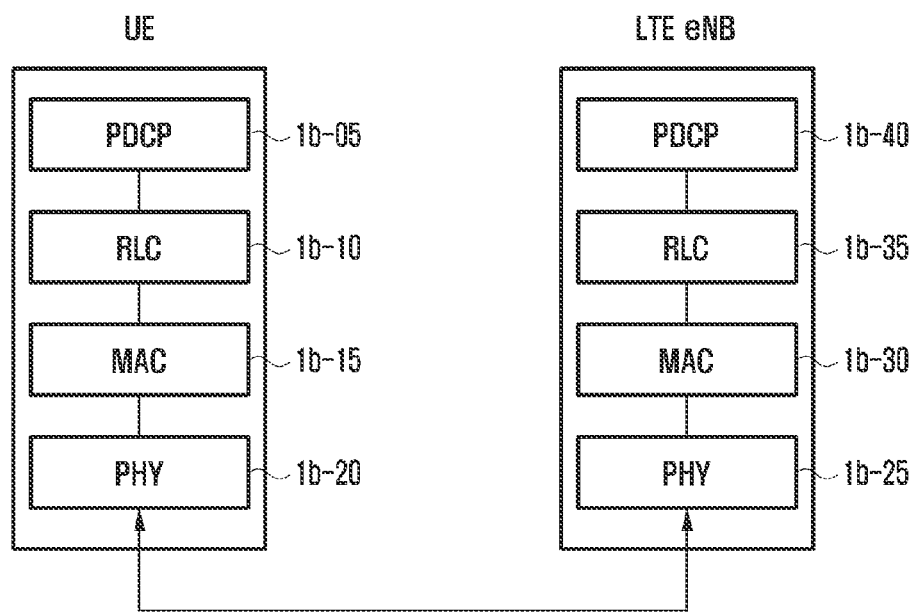
FIG. 1B is a diagram illustrating a radio protocol structure of an LTE system according to an embodiment of the disclosure.

FIG. 1B is a diagram illustrating a radio protocol structure in an LTE system according to an embodiment of the disclosure.

Referring to FIG. 1B, in UE or an eNB, a radio protocol of an LTE system is composed of a packet data convergence protocol (PDCP) 1b-05 or 1b-40, a radio link control (RLC) 1b-10 or 1b-35, and a medium access control (MAC) 1b-15 or 1b-30. The PDCP 1b-05 or 1b-40 takes charge of IP header compression/decompression operations. The main functions of the PDCP are summarized as follows.

Header compression and decompression: robust header compression (ROHC) only

Transfer of user data

In-sequence delivery of upper layer protocol data units (PDUs) at a PDCP reestablishment procedure for an RLC AM For split bearers in DC (only support for an RLC AM): PDCP PDU routing for transmission and PDCP PDU reordering for reception Duplicate detection of lower layer service data units (SDUs) at a PDCP reestablishment procedure for a radio link control acknowledge mode (RLC AM)

Retransmission of PDCP SDUs at handover and, for split bearers in DC, of PDCP PDUs at a PDCP data-recovery procedure, for an RLC AM Ciphering and deciphering Timer-based SDU discard in an uplink The RLC 1b-10 or 1b-35 reconfigures a PDCP PDU with a proper size and performs an automatic repeat request (ARQ) operation and the like. The main functions of the RLC are summarized as follows.

Transfer of upper layer PDUs

Error correction through an ARQ (only for AM data transfer)

Concatenation, segmentation, and reassembly of RLC SDUs (only for UM and AM data transfer)

Re-segmentation of RLC data PDUs (only for UM and AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM transfer)

RLC reestablishment

The MAC 1b-15 or 1b-30 is connected to several RLC layer devices configured in one terminal, and performs multiplexing/demultiplexing of RLC PDUs into/from MAC PDU. The main functions of the MAC are summarized as follows.

Mapping between logical channels and transport channels

Multiplexing/demultiplexing of MAC SDUs belonging to one or different logical channels into/from transport blocks (TB) transferred to/from the physical layer on transport channels Scheduling information reporting HARQ function (error correction through HARQ)

Priority handling between logical channels of one UE

Priority handling between UEs by means of dynamic scheduling

MBMS service identification

Transport format selection padding

The physical layer 1b-20 or 1b-25 performs channel coding and modulation of upper layer data to configure and transmit OFDM symbols on a radio channel, or performs demodulation and channel decoding of the OFDM symbols received on the radio channel to transfer the demodulated and channel-decoded symbols to an upper layer.

Figure 1C:
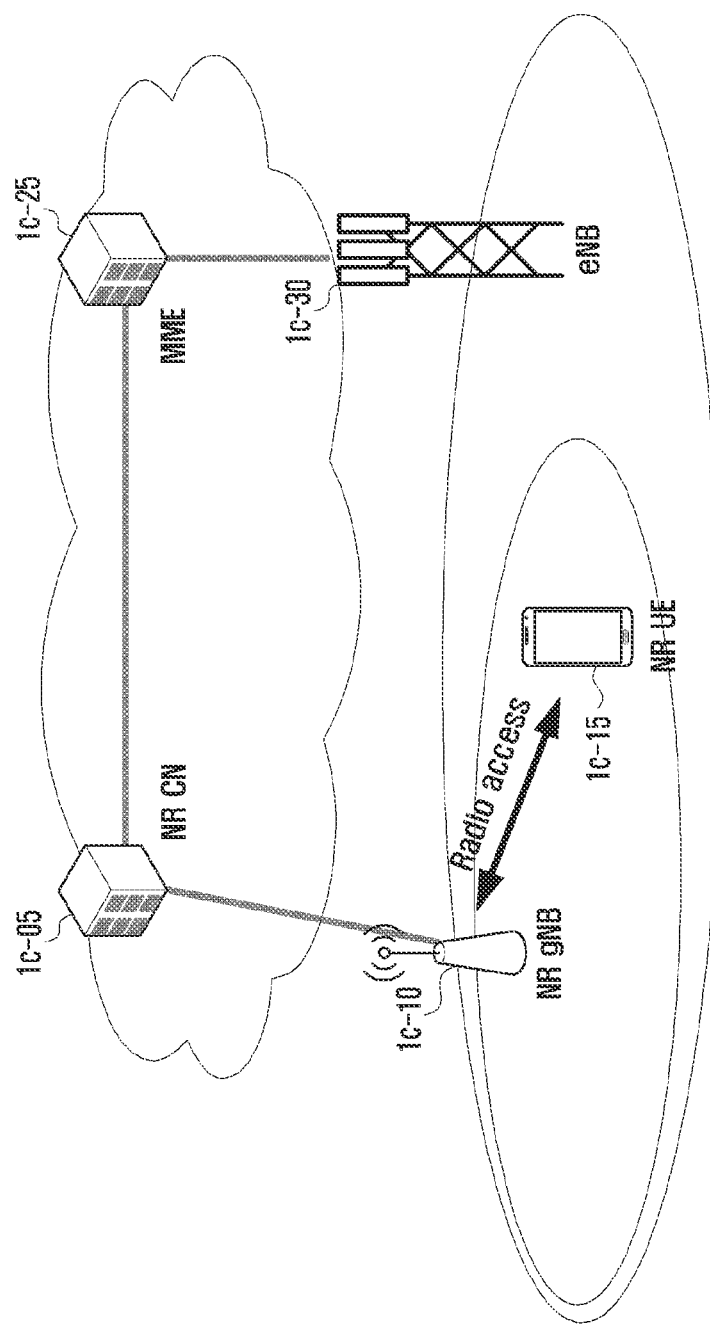
FIG. 1C is a diagram illustrating the structure of a next-generation mobile communication system proposed according to an embodiment of the disclosure.

FIG. 1C is a diagram illustrating the structure of a next-generation mobile communication system proposed according to an embodiment of the disclosure.

Referring to FIG. 1C, as illustrated, a RAN of a next-generation mobile communication system (hereinafter referred to as "NR" or "5G") is composed of a new radio node B (hereinafter referred to as "NR gNB" or "NR eNB") 1c-10 and a new radio core network (NR CN) 1c-05. A new radio user equipment (hereinafter referred to as "NR UE" or "terminal") 1c-15 accesses to an external network through the NR gNB 1c-10 and the NR CN 1c-05.

In FIG. 1C, the NR gNB 1c-10 corresponds to an evolved node B (eNB) of the existing LTE system. The NR gNB is connected to the NR UE 1c-15 on a radio channel, and thus it can provide a more superior service than the service of the existing node B. Since all user traffics are serviced on shared channels in the next-generation mobile communication system, a device that performs scheduling through consolidation of status information, such as a buffer state of UEs, an available transmission power state, and a channel state, is required, and the NR gNB 1c-10 takes charge of this. One NR gNB generally controls a plurality of cells. In order to implement ultrahigh-speed data transmission as compared with the existing LTE, the NR gNB may have a bandwidth that is equal to or higher than the existing maximum bandwidth, and a beamforming technology may be additionally grafted in consideration of OFDM as a radio access technology. Further, an AMC scheme determining a modulation scheme and a channel coding rate to match the channel state of the UE is adopted. The NR CN 1c-05 performs functions of mobility support, bearer setup, and quality of service (QoS) configuration. The NR CN is a device that takes charge of not only a mobility management function of the UE but also various kinds of control functions, and is connected to a plurality of eNBs. Further, the next-generation mobile communication system may interlock with the existing LTE system, and the NR CN is connected to an MME 1c-25 through a network interface. The MME is connected to an eNB 1c-30 that is the existing eNB.

Figure 1D:
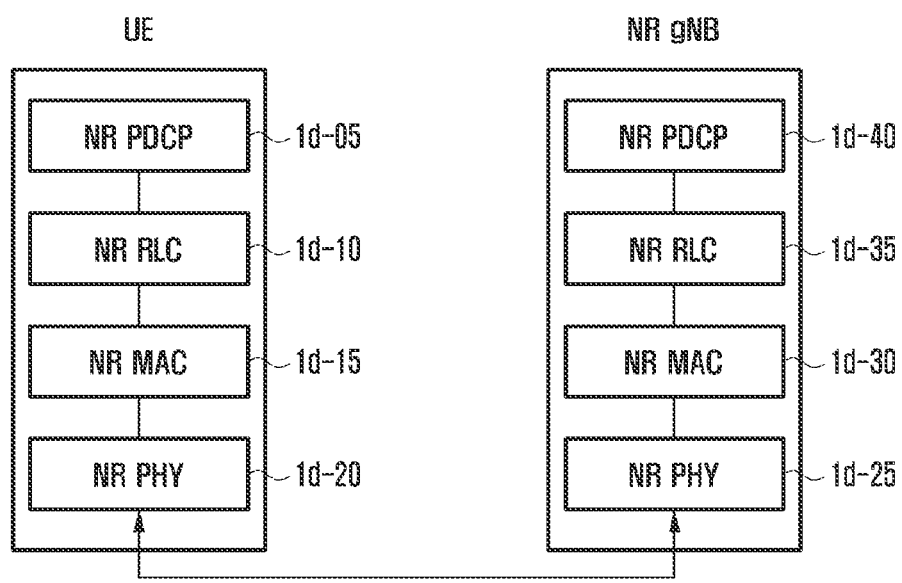
FIG. 1D is a diagram illustrating a radio protocol structure of a next-generation mobile communication system proposed according to an embodiment of the disclosure.

FIG. 1D is a diagram illustrating a radio protocol structure of a next-generation mobile communication system proposed according to an embodiment of the disclosure.

Referring to FIG. 1D, in UE or an NR eNB, a radio protocol of the next-generation mobile communication system is composed of an NR PDCP 1d-05 or 1d-40, an NR RLC 1d-10 or 1d-35, and an NR MAC 1d-15 or 1d-30. The main functions of the NR PDCP 1d-05 or 1d-40 may include parts of the following functions.

Header compression and decompression: ROHC only

Transfer of user data

In-sequence delivery of upper layer PDUs

PDCP PDU reordering for reception

Duplicate detection of lower layer SDUs

Retransmission of PDCP SDUs

Ciphering and deciphering

Timer-based SDU discard in an uplink

As described above, reordering of the NR PDCP devices may mean reordering of PDCP PDUs received from a lower layer based on PDCP sequence numbers (SNs). The reordering may include transfer of data to an upper layer in the order of reordering, recording of lost PDCP PDUs through reordering, status report for the lost PDCP PDUs to a transmission side, and retransmission request for the lost PDCP PDUs.

The main functions of the NR RLC 1d-10 or 1d-35 may include parts of the following functions.

Transfer of upper layer PDUs

In-sequence delivery of upper layer PDUs

Out-of-sequence delivery of upper layer PDUs

Error correction through an ARQ

Concatenation, segmentation, and reassembly of RLC SDUs

Re-segmentation of RLC data PDUs

Reordering of RLC data PDUs

Duplicate detection

Protocol error detection

RLC SDU discard

RLC reestablishment

As described above, in-sequence delivery of NR RLC devices may mean in-sequence delivery of RLC SDUs received from a lower layer to an upper layer. In case where one original RLC SDU is segmented into several RLC SDUs to be received, the delivery may include reassembly and delivery of the RLC SDUs, reordering of the received RLC PDUs based on an RLC SN or a PDCP SN, recording of lost RLC PDUs through reordering, status report for the lost RLC PDUs to a transmission side, retransmission request for the lost PDCP PDUs, in-sequence delivery of only RLC SDUs just before the lost RLC SDU to an upper layer if there is the lost RLC SDU, in-sequence delivery of all RLC SDUs received before a specific timer starts its operation to an upper layer if the timer has expired although there is the lost RLC SDU, or in-sequence delivery of all RLC SDUs received up to now to an upper layer if the timer has expired although there is the lost RLC SDU. The NR RLC layer may not include a concatenation function, and the function may be performed by an NR MAC layer or may be replaced by a multiplexing function of the NR MAC layer.

As described above, the out-of-sequence delivery of the NR RLC device means a function of transferring the RLC SDUs received from a lower layer directly to an upper layer in an out-of-sequence manner. If one original RLC SDU is segmented into several RLC SDUs to be received, the delivery may include reassembly and delivery of the RLC SDUs, and recording of the lost RLC PDUs through storing and ordering the RLC SNs or PDCP SNs of the received RLC PDUs.

The NR MAC 1d-15 or 1d-30 may be connected to several NR RLC layer devices configured in one UE, and the main functions of the NR MAC may include parts of the following functions.

Mapping between logical channels and transport channels

Multiplexing/demultiplexing of MAC SDUs

Scheduling information reporting
HARQ function (error correction through HARQ)
Priority handling between logical channels of one UE
Priority handling between UEs by means of dynamic scheduling
MBMS service identification
Transport format selection
padding The NR PHY layer 1*d*-20 or 1*d*-25 may perform channel coding and modulation of upper layer data to configure and transmit OFDM symbols to a radio channel, or may perform demodulation and channel decoding of the OFDM symbols received on the radio channel to transfer the demodulated and channel-decoded symbols to an upper layer.

Figure 1E:
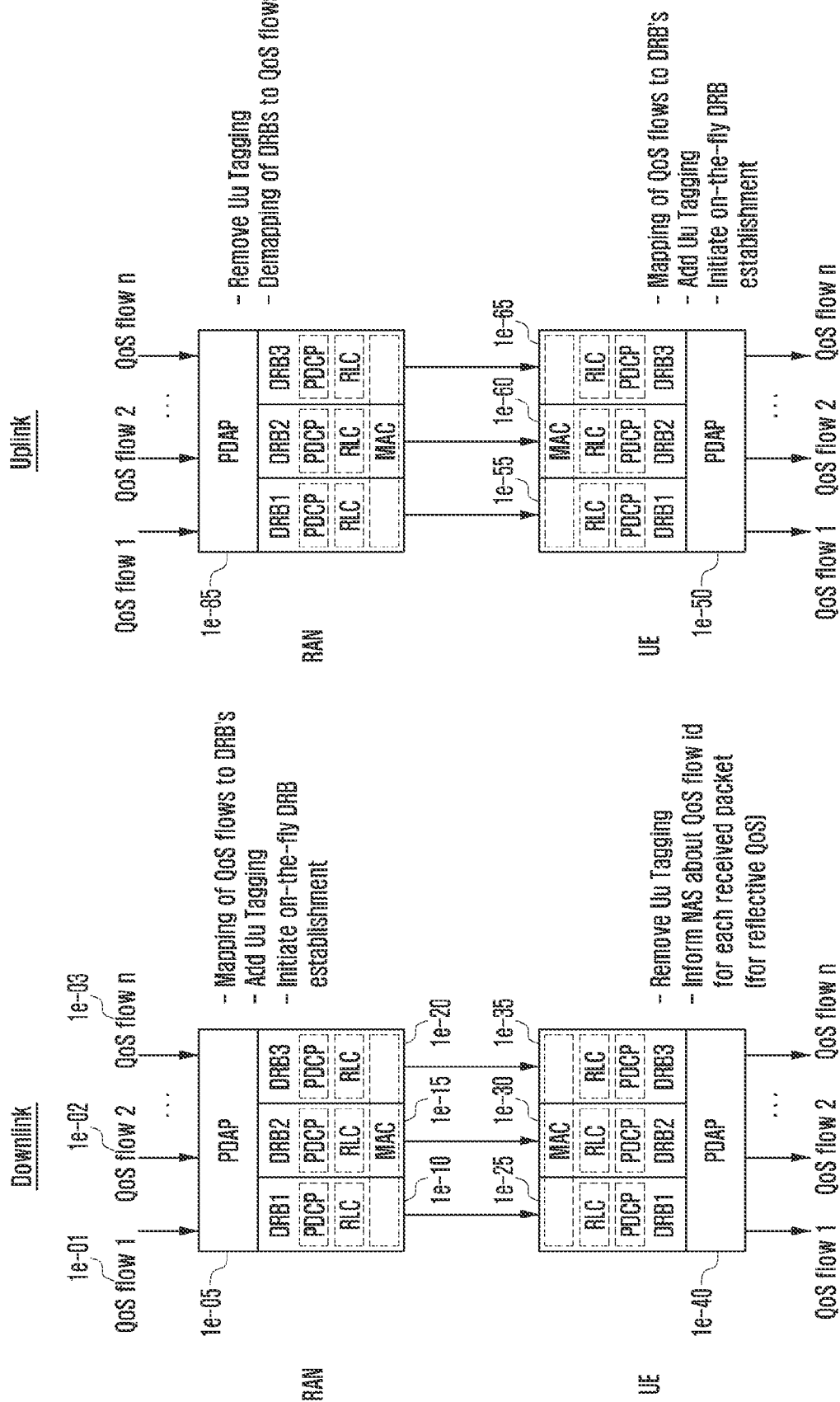
FIG. 1E is a diagram explaining new layers and functions to manage a quality of service (QoS) in a next-generation system according to an embodiment of the disclosure.

FIG. 1E is a diagram explaining new layers and functions to manage a QoS in a next-generation system according to an embodiment of the disclosure.

In the next-generation system, it is required to configure a user traffic transmission path or to control an IP flow for each service in accordance with each service requiring a different QoS, that is, QoS requirements. In the next-generation mobile communication system, a plurality of QoS flows may be mapped onto a plurality of data radio bearer (DRB) to be simultaneously configured. That is, in a downlink, a plurality of QoS flows 1*e*-01, 1*e*-02, and 1*e*-03 may be mapped onto the same DRB or different DRBs 1*e*-10, 1*e*-15, and 1*e*-20, and it is necessary to mark a QoS flow ID on a downlink packet to discriminate between them. Since such a function is a function that has not been in an existing LTE PDCP layer, a new layer taking charge of this (of which the layer name may be called a PDAP, ASML, or another name, i.e., packet data association protocol (PDAP) or AS multiplexing layer (ASML)) 1*e*-05, 1*e*-40, 1*e*-50, or 1*e*-85 may be introduced. Further, the above-described mark may permit a terminal to implement a reflective QoS with respect to an uplink. As described above, explicit marking of the QoS flow ID on the downlink packet corresponds to a simple method for an access stratum (AS) of the terminal to provide the above-described information to a NAS. In the downlink, a method for mapping the IP flows onto the DRBs may be composed of two stages below.

1. NAS level mapping: IP flow 4→QoS flow
2. AS level mapping: QoS flow 4→DRB

For a downlink reception, QoS flow mapping information and existence/nonexistence of a reflective QoS operation may be grasped for each received DRB 1*e*-25, 1*e*-30, or 1*e*-35, and corresponding information may be transferred to the NAS.

In the same manner, the two-stage mapping may also be used for an uplink. First, the IP flows are mapped onto the QoS flows through NAS signaling, and the AS performs mapping of the QoS flows onto the DRBs 1*e*-55, 1*e*-60, and 1*e*-65. The terminal may mark the QoS flow ID on the uplink packet, or may transfer the packet as it is without marking the QoS flow ID thereon. The above-described function is performed by the new layer (PDAP or ASML) of the terminal. If the QoS flow ID is marked on the uplink packet, a base station may mark the QoS flow ID on the packet to transfer the above-described information to an NG-U without an uplink traffic flow template (TFT).

Figure 1F:
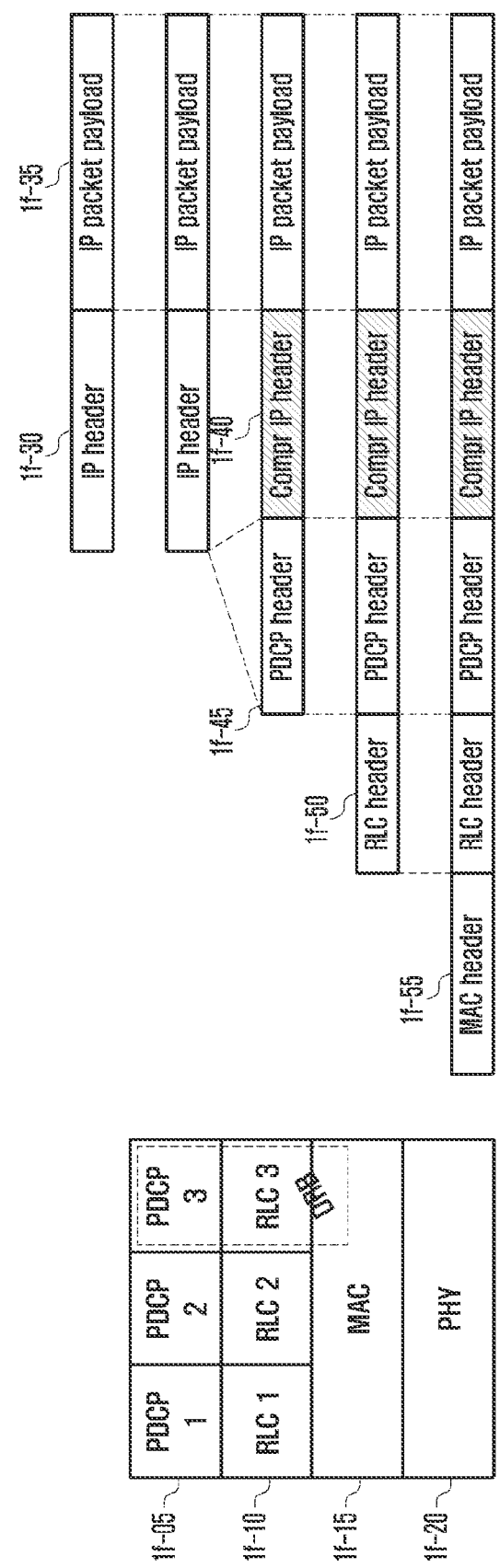
FIG. 1F is a diagram illustrating a general procedure in which a transmitter side processes an Internet protocol (IP) packet according to an embodiment of the disclosure.

FIG. 1F is a diagram illustrating a general procedure in which a transmitter side processes an IP packet according to an embodiment of the disclosure.

Referring to FIG. 1F, if an IP packet is received, a PDCP layer 1*f*-05 performs a procedure of compressing a header of the IP packet. The header compression procedure may be a RoHC procedure. A scheme for compressing the IP header through the RoHC procedure may be performed in a manner that the same source IP address or destination IP address is omitted, and only a changed portion is reflected in the header. In order to perform the IP header compression procedure, the PDCP layer recognizes an IP header portion 1*f*-30 from the IP packet including IP packet payload 1*f*-35, performs compression of the IP header to make a compressed IP header 1*f*-40, performs a ciphering procedure, attaches a PDCP header 1*f*-45 to the compressed IP header, and transfers the IP packet to an RLC layer. The above-described compression process is an important procedure to reduce an overhead during data transmission. The RLC layer performs the functions as described above with reference to FIG. 1D, attaches an RLC header 1*f*-50 to the PDCP header, and transfers the IP packet to a MAC layer. The MAC layer that has received this performs the functions as described above with reference to FIG. 1D, and attaches a MAC header 1*f*-55 to the RLC header. The above-described processes may be repeated whenever the PDCP layer 1*f*-05, the RLC layer 1*f*-10, the MAC layer 1*f*-15, and a physical (PHY) layer 1*f*-20 receive the IP packet.

Figure 1G:
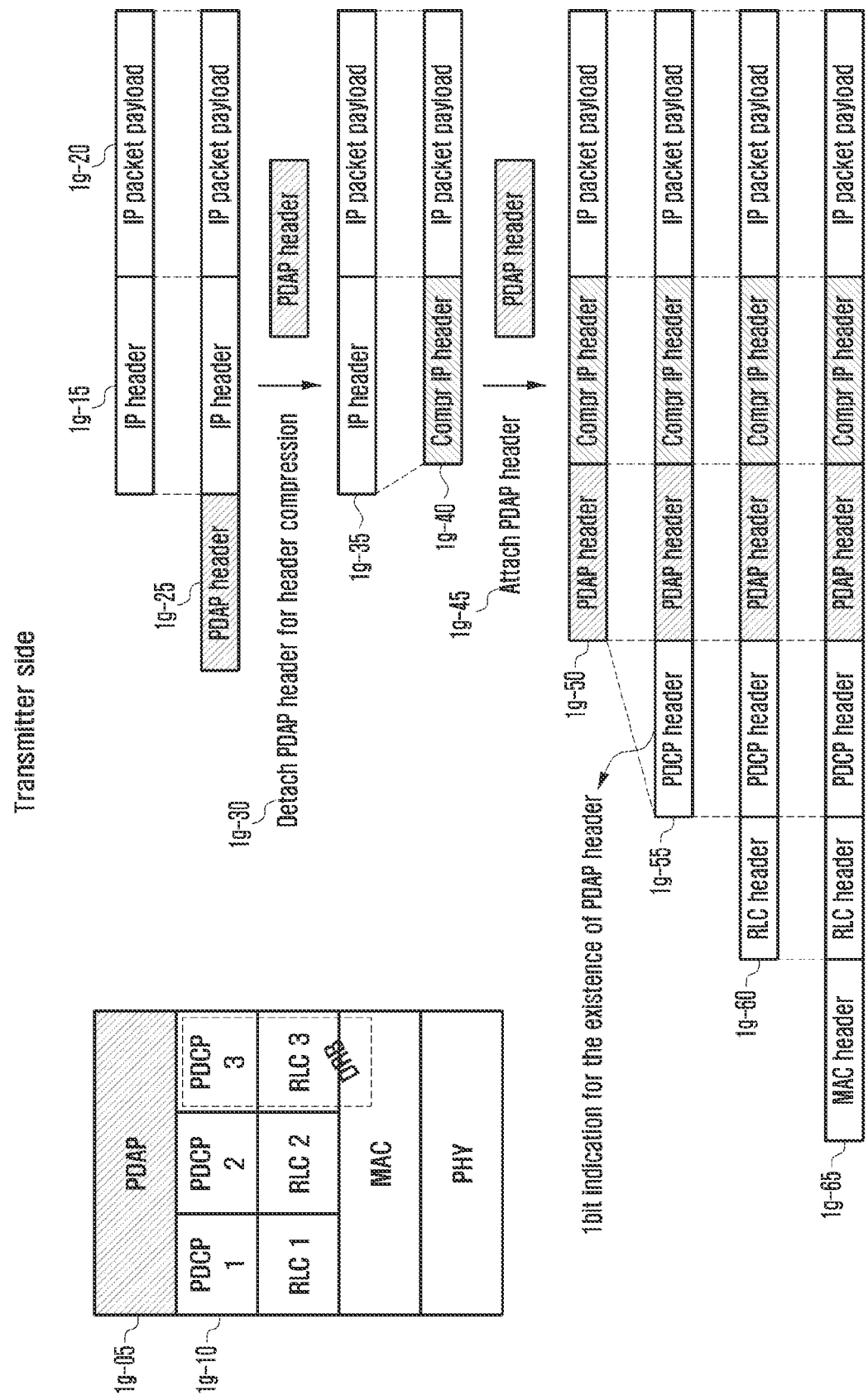
FIG. 1G is a diagram illustrating a (1-1)-th embodiment of a transmitter end packet data convergence protocol (PDCP) layer in which a transmitter end introduces a new layer for processing a QoS for each IP flow and processes an IP packet according to an embodiment of the disclosure.

FIG. 1G is a diagram illustrating a (1-1)-th embodiment of a transmitter end PDCP layer in which a transmitter end introduces a new layer for processing a QoS for each IP flow and processes an IP packet according to an embodiment of the disclosure.

Referring to FIG. 1G according to the disclosure, a new layer 1*g*-05 may be introduced above a PDCP layer 1*g*-10. The new layer may be called a PDAP, an ASML, or another name The new layer may include the following functions.

1. Routing or mapping QoS flows onto DRBs
2. Marking QoS flow identifiers (IDs) on downlink packets
3. Marking QoS flow identifiers (IDs) on uplink packets In the (1-1)-th embodiment of the disclosure, if it is necessary to attach a PDAP header to a received IP packet including an IP header 1*g*-15 and IP packet payload 1*g*-20, the new PDAP layer inserts a QoS flow ID or other necessary information into the PDAP header by applying mapping information between an IP flow predetermined in a network and a QoS flow. Then, the new PDAP layer may attach the PDAP header 1*g*-25 to the front of the IP packet to be transferred to the PDCP layer.

In the disclosure, if the IP packet is received from the PDAP layer, the PDCP layer performs the following operations to process the IP packet supporting various QoS services.

The PDCP layer on the transmitter side receives data from the PDAP layer,
if the (1-1)-th condition is satisfied, the PDCP layer performs the (1-1)-th operation, and
if the (2-1)-th condition is satisfied, the PDCP layer performs the (2-1)-th operation.

As described above, the (1-1)-th condition corresponds to a case where the PDCP layer can be indicated by the PDAP layer or know that the PDAP header is attached (e.g., the PDAP header may be always attached), or a case where the PDCP layer can indirectly know that the PDAP header is attached through recognizing that the terminal is connected to a 5G core network (5G-CN).

Further, the (2-1)-th condition corresponds to a case where the PDCP layer can be indicated by the PDAP layer or know that the PDAP header is not attached, or a case where the PDCP layer can indirectly know that the PDAP header is not attached through recognizing that the terminal is connected to an enhanced packet core (EPC, or LTE EPC).

As described above, the (1-1)-th operation indicates an operation in which the PDCP layer removes the first n bytes of a PDCP SDU, that is, a PDAP header (1g-30), performs header compression (1g-40) with respect to the IP header 1g-35, attaches the PDAP header 1g-50 again after performing ciphering, indicates existence of the PDAP header by configuring a 1-bit indicator field to a PDCP header, attaches the PDCP header, and transfers a PDCP PDU to the RLC layer (1g-45).

Further, the (2-1)-th operation indicates an operation in which the PDCP layer performs header compression with respect to the IP header (1g-40), indicates nonexistence of the PDAP header by configuring the 1-bit indicator field to the PDCP header 1g-55 after performing ciphering, attaches the PDCP header, and transfers the PDCP PDU to the RLC layer (1g-45).

The compression process is an important procedure to reduce an overhead during data transmission. The RLC layer performs the functions as described above with reference to FIG. 1D, attaches an RLC header 1g-60, and transfers the IP packet to the MAC layer. The MAC layer that has received this performs the functions as described above with reference to FIG. 1D, and attaches a MAC header 1g-65.

Figure 1H:
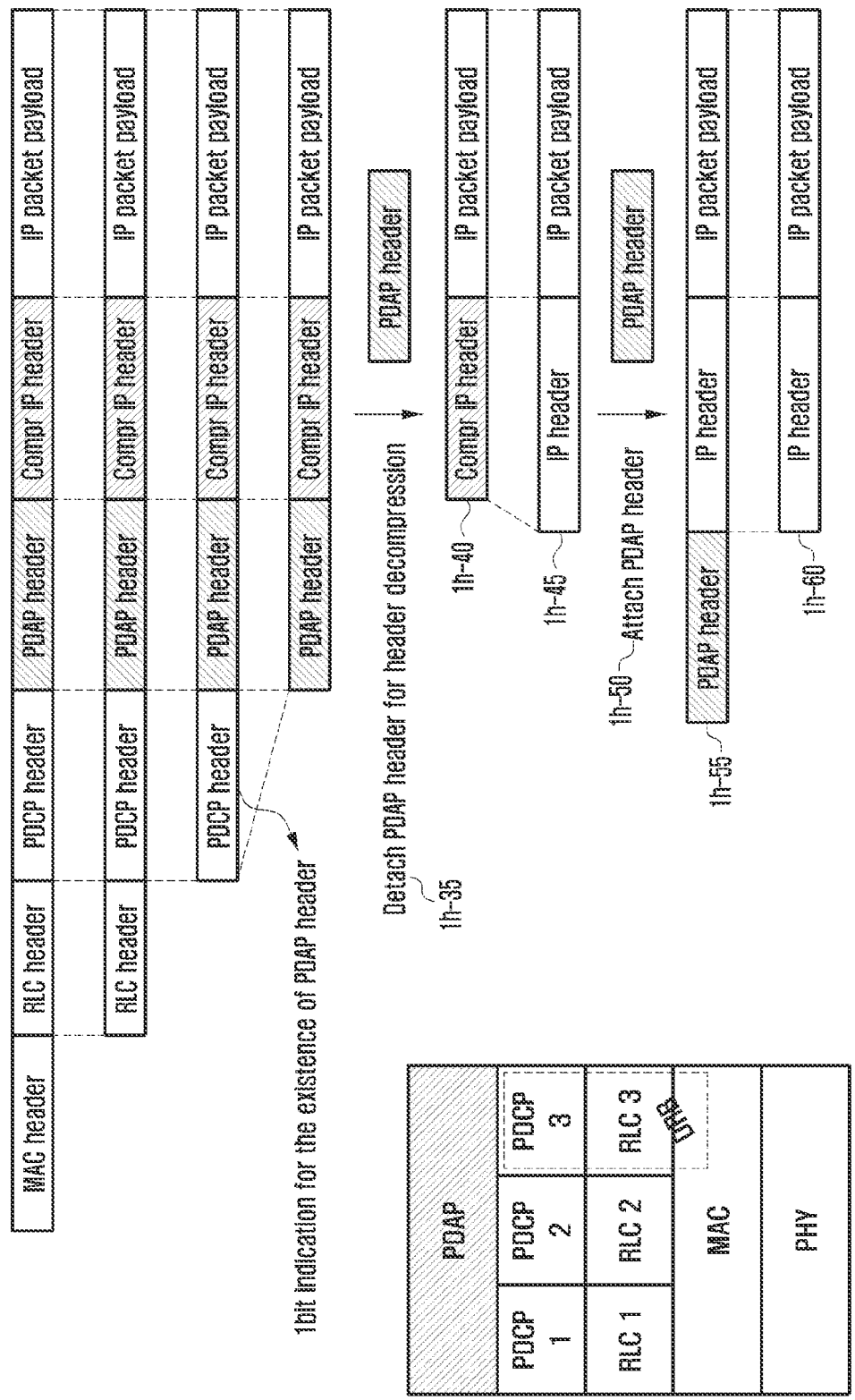
FIG. 1H is a diagram illustrating a (1-1)-th embodiment of a receiver end PDCP layer in which a receiver end introduces a new layer for processing a QoS for each IP flow and processes an IP packet according to an embodiment of the disclosure.

FIG. 1H is a diagram illustrating a (1-1)-th embodiment of a receiver end PDCP layer in which a receiver end introduces a new layer for processing a QoS for each IP flow and processes an IP packet according to an embodiment of the disclosure.

The PDCP layer on the receiver side receives data from an RLC layer,
if the (1-2)-th condition is satisfied, the PDCP layer performs the (1-2)-th operation, and
if the (2-2)-th condition is satisfied, the PDCP layer performs the (2-2)-th operation.

As described above, the (1-2)-th condition corresponds to a case where a 1-bit indicator of a PDCP header of a received PDCP PDU indicates that a PDAP header exists, a case where it can be indirectly known that the PDAP header is attached through recognizing that the terminal is connected to a 5G core network (5G-CN), or a case where the PDAP header is always attached.

Further, the (2-2)-th condition corresponds to a case where the 1-bit indicator of the PDCP header of the received PDCP PDU indicates that the PDAP header does not exist, or a case where it can be indirectly known that the PDAP header is not attached through recognizing that the terminal is connected to an enhanced packet core (EPC, or LTE EPC).

As described above, the (1-2)-th operation indicates an operation in which the PDCP layer removes the PDCP header and removes the first n bytes of the PDCP SDU, that is, the PDAP header (1h-35), recovers the original IP header 1h-45 by performing restoration of the compressed IP header 1h-40 after performing deciphering, attaches the PDAP header 1h-55 again (1h-50), and transfers the data to a PDAP layer (existence of the PDAP header may be indicated to the PDAP layer).

Further, the (2-2)-th operation indicates an operation in which the PDCP layer removes the PDCP header, performs deciphering of the PDCP SDU, recovers the original IP header 1h-45 by performing restoration of the compressed IP header 1h-40, and transfers the data to the PDAP layer (nonexistence of the PDAP header may be indicated to the PDAP layer).

As described above, if the PDAP header exists, the PDAP layer analyzes the PDAP header 1h-55, identifies the QoS flow ID, performs mapping of the QoS flow ID onto the IP flow, and transfers the data 1h-60 to the EPC or 5G-CN. The PDCP layer may indicate existence/nonexistence of the PDAP header to the PDAP layer. It may not be necessary to indicate the existence/nonexistence of the PDAP header if the PDAP header is always attached or the existence/nonexistence of the PDAP header can be indirectly known through connection of the terminal to the EPC or 5G-CN.

In the (1-2)-th embodiment of the disclosure, if it is necessary to attach a PDAP header to a received IP packet, the new PDAP layer inserts a QoS flow ID or other necessary information into the PDAP header by applying mapping information between an IP flow predetermined in a network and a QoS flow. Then, the new PDAP layer may attach the PDAP header to the front of the IP packet to be transferred to the PDCP layer (1g-25).

In the disclosure, if the IP packet is received from the PDAP layer, the PDCP layer performs the following operations to process the IP packet supporting various QoS services.

The PDCP layer on the transmitter side receives data from the PDAP layer,
if the (1-1)-th condition is satisfied, the PDCP layer performs the (1-1)-th operation, and
if the (2-1)-th condition is satisfied, the PDCP layer performs the (2-1)-th operation.

As described above, the (1-1)-th condition corresponds to a case where the PDCP layer can be indicated by the PDAP layer or know that the PDAP header is attached (e.g., the PDAP header may be always attached), or a case where the PDCP layer can indirectly know that the PDAP header is attached through recognizing that the terminal is connected to a 5G core network (5G-CN).

Further, the (2-1)-th condition corresponds to a case where the PDCP layer can be indicated by the PDAP layer or know that the PDAP header is not attached, or a case where the PDCP layer can indirectly know that the PDAP header is not attached through recognizing that the terminal is connected to an enhanced packet core (EPC, or LTE EPC).

As described above, the (1-1)-th operation indicates an operation in which the PDCP layer removes the first n bytes of a PDCP SDU, that is, a PDAP header (1g-30), performs header compression with respect to the IP header (1g-40), attaches the PDAP header again after performing ciphering, attaches the PDCP header, and transfers a PDCP PDU to the RLC layer (1g-45).

Further, the (2-1)-th operation indicates an operation in which the PDCP layer performs header compression with respect to the IP header (1g-40), attaches the PDCP header after performing ciphering, and transfers a PDCP PDU to the RLC layer (1g-45).

The compression process is an important procedure to reduce an overhead during data transmission. The RLC layer performs the functions as described above with reference to FIG. 1D, attaches an RLC header 1g-60, and transfers the IP packet to the MAC layer. The MAC layer that has received this performs the functions as described above with reference to FIG. 1D, and attaches a MAC header 1g-65.

FIG. 1H is a diagram illustrating a (1-2)-th embodiment of a receiver end PDCP layer in which a receiver end introduces a new layer for processing a QoS for each IP flow and processes an IP packet according to an embodiment of the disclosure.

The PDCP layer on the receiver side receives data from an RLC layer,
if the (1-2)-th condition is satisfied, the PDCP layer performs the (1-2)-th operation, and
if the (2-2)-th condition is satisfied, the PDCP layer performs the (2-2)-th operation.

As described above, the (1-2)-th condition corresponds to a case where it can be indirectly known that the PDAP header is attached through recognizing that the terminal is connected to a 5G core network (5G-CN), or a case where the PDAP header is always attached.

Further, the (2-2)-th condition corresponds to a case where it can be indirectly known that the PDAP header is not attached through recognizing that the terminal is connected to an enhanced packet core (EPC, or LTE EPC).

As described above, the (1-2)-th operation indicates an operation in which the PDCP layer removes the PDCP header and removes the first n bytes of the PDCP SDU, that is, the PDAP header (1h-35), recovers the original IP header 1h-45 by performing restoration of the compressed IP header 1h-40 after performing deciphering, attaches the PDAP header 1h-55 again (1h-50), and transfers the data to a PDAP layer (existence of the PDAP header may be indicated to the PDAP layer).

Further, the (2-2)-th operation indicates an operation in which the PDCP layer removes the PDCP header, performs deciphering of the PDCP SDU, recovers the original IP header 1h-45 by performing restoration of the compressed IP header 1h-40, and transfers the data to the PDAP layer (nonexistence of the PDAP header may be indicated to the PDAP layer).

As described above, if the PDAP header exists, the PDAP layer analyzes the PDAP header 1h-55, identifies the QoS flow ID, performs mapping of the QoS flow ID onto the IP flow, and transfers the data 1h-60 to the EPC or 5G-CN. The PDCP layer may indicate existence/nonexistence of the PDAP header to the PDAP layer. It may not be necessary to indicate the existence/nonexistence of the PDAP header if the PDAP header is always attached or the existence/nonexistence of the PDAP header can be indirectly known through connection of the terminal to the EPC or 5G-CN.

Figure 1I:
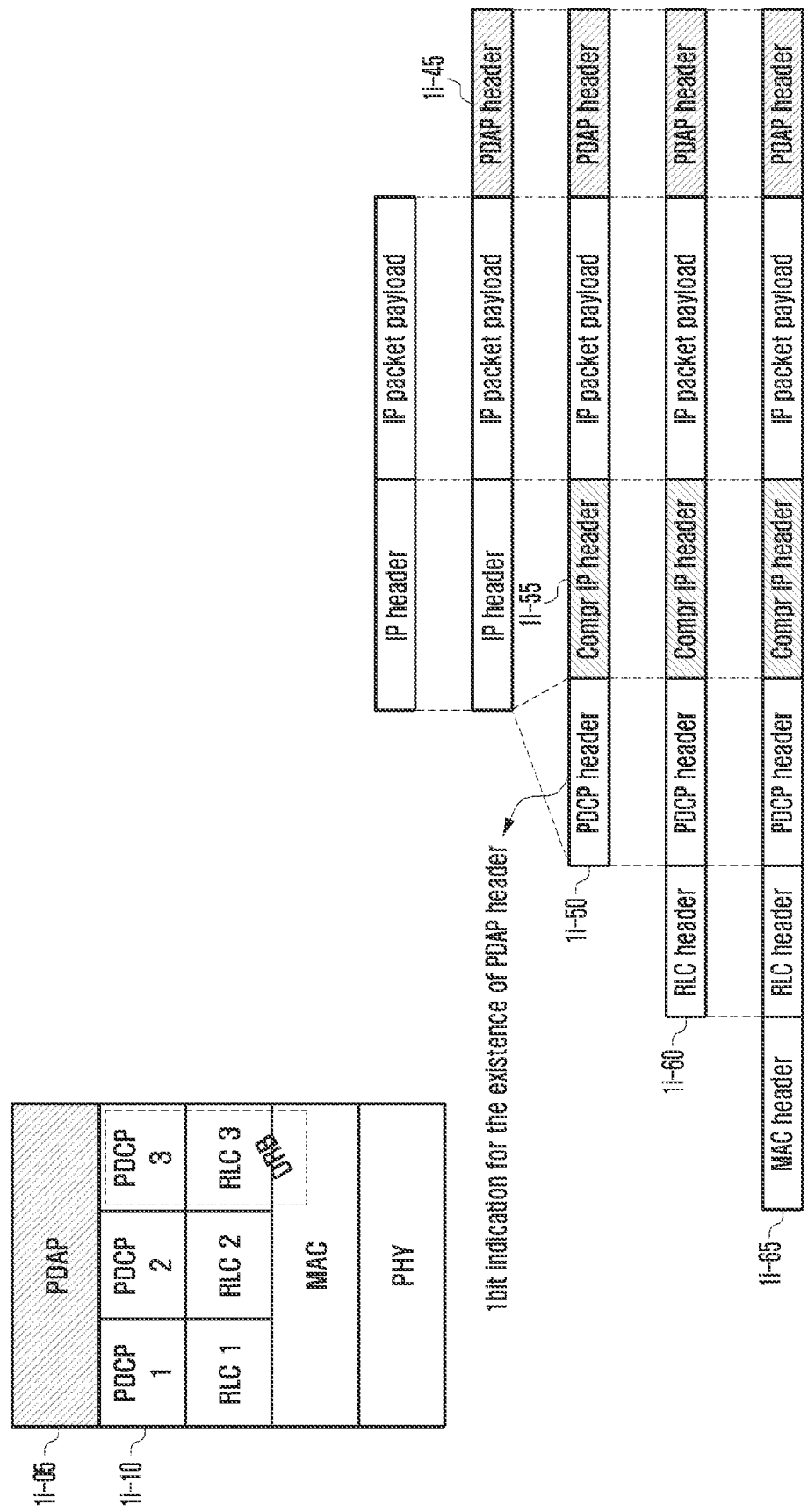
FIGS. 1I and 1J are diagrams illustrating a (1-3)-th embodiment of a transmitter end PDCP layer in which a transmitter end and a receiver end introduce a new layer for processing a QoS for each IP flow and process an IP packet according to an embodiment of the disclosure.
Figure 1J:
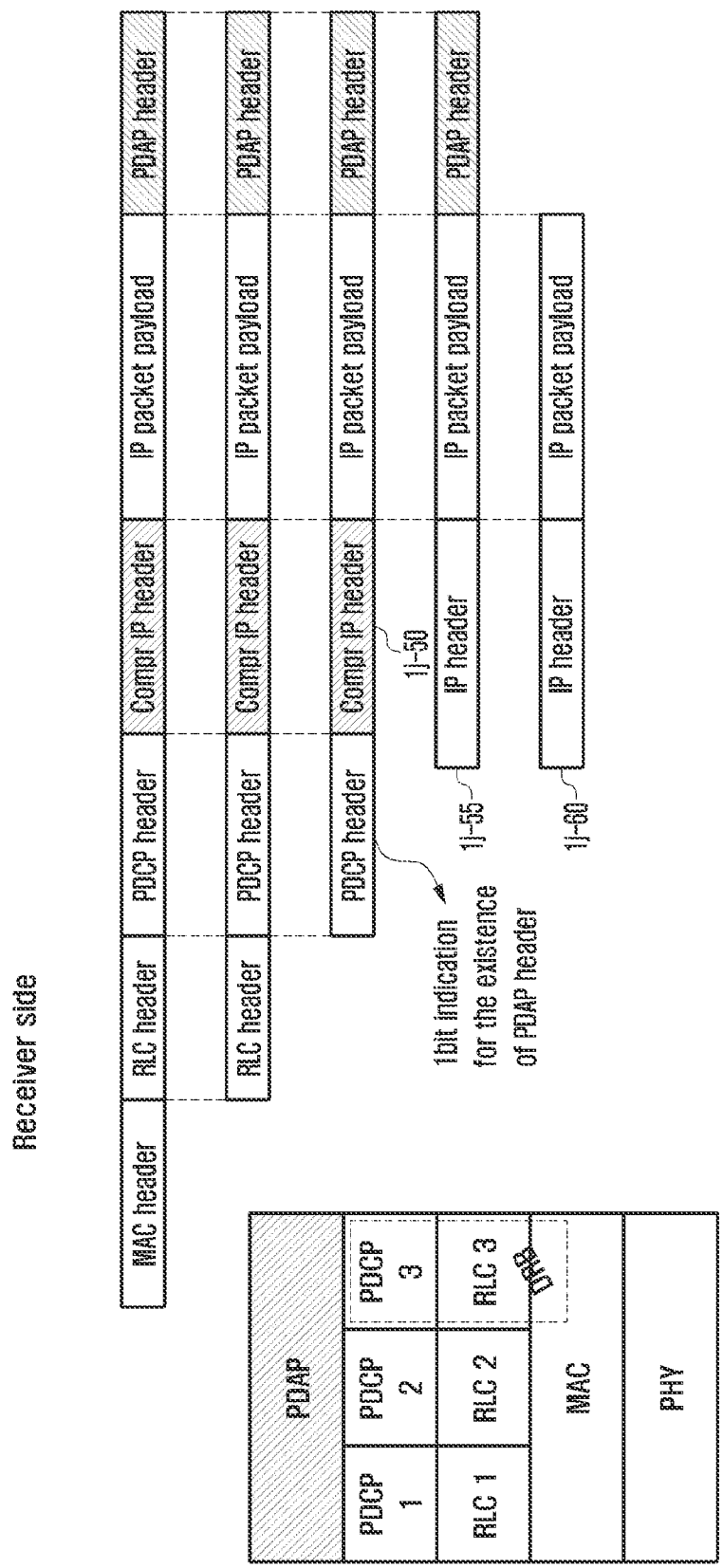

FIGS. 1I and 1J are diagrams illustrating a (1-3)-th embodiment of a transmitter end PDCP layer in which a transmitter end and a receiver end introduce a new layer for processing a QoS for each IP flow and process an IP packet according to various embodiments of the disclosure.

Referring to FIG. 1I according to the disclosure, a new layer 1i-05 may be introduced above a PDCP layer 1i-10. The new layer may be called a PDAP, an ASML, or another name. The new layer may include the following functions.

1. Routing or mapping QoS flows onto DRBs
2. Marking QoS flow identifiers (IDs) on downlink packets
3. Marking QoS flow identifiers (IDs) on uplink packets In the (1-3)-th embodiment of the disclosure, if an IP packet is received, the new PDAP layer inserts a QoS flow ID or other necessary information into the PDAP header by applying mapping information between an IP flow predetermined in a network and a QoS flow. Then, the new PDAP layer may attach the PDAP header to the rear of the IP packet to be transferred to the PDCP layer (1i-45).

The core of the method according to the (1-3)-th embodiment is for the PDAP layer to attach the PDAP header to the rear part of the IP packet (1i-45). Accordingly, without the necessity of discriminating or separating the PDAP header on the transmitter side, the PDCP layer may directly compress the IP header of the PDCP SDU (1i-55), attach the PDCP header after performing a ciphering procedure, and then transfer data to the RLC layer. Further, without the necessity of discriminating or separating the PDAP header on the receiver side, the PDCP layer may directly restore the IP header of the PDCP SDU (1j-55), remove the PDCP header after performing a deciphering procedure, and then transfer data to the PDAP layer. In this case, the PDCP layer may indicate existence/nonexistence of the PDAP header to the PDAP layer. Such an indication is not necessary if the PDAP header is always attached or the existence/nonexistence of the PDAP header can be indirectly known through connection of the terminal to the EPC or 5G-CN. In this case, if the PDAP header exists, the PDAP layer may analyze the PDAP header, starting from the rear part of the PDCP SDU received from the PDCP layer.

In the (1-3)-th embodiment of the disclosure, if it is necessary to attach a PDAP header to a received IP packet, the new PDAP layer inserts a QoS flow ID or other necessary information into the PDAP header by applying mapping information between an IP flow predetermined in a network and a QoS flow. Then, the new PDAP layer may attach the PDAP header to the rear of the IP packet to be transferred to the PDCP layer (1i-45).

In the disclosure, if the IP packet is received from the PDAP layer, the PDCP layer performs the following operations to process the IP packet supporting various QoS services.

The PDCP layer on the transmitter side receives data from the PDAP layer, if the (1-1)-th condition is satisfied, the PDCP layer performs the (1-1)-th operation, and if the (2-1)-th condition is satisfied, the PDCP layer performs the (2-1)-th operation.

As described above, the (1-1)-th condition corresponds to a case where the PDCP layer can be indicated by the PDAP layer or know that the PDAP header is attached (e.g., the PDAP header may be always attached), or a case where the PDCP layer can indirectly know that the PDAP header is attached through recognizing that the terminal is connected to a 5G core network (5G-CN).

Further, the (2-1)-th condition corresponds to a case where the PDCP layer can be indicated by the PDAP layer or know that the PDAP header is not attached, or a case where the PDCP layer can indirectly know that the PDAP header is not attached through recognizing that the terminal is connected to an enhanced packet core (EPC, or LTE EPC).

As described above, the (1-1)-th operation indicates an operation in which the PDCP layer performs header compression with respect to the IP header (1i-55), performs ciphering with the PDAP header attached again, indicates existence of the PDAP header by configuring a 1-bit indicator field to a PDCP header, attaches the PDCP header, and transfers a PDCP PDU to the RLC layer (1i-50).

Further, the (2-1)-th operation indicates an operation in which the PDCP layer performs header compression with respect to the IP header (1i-55), indicates nonexistence of the PDAP header by configuring the 1-bit indicator field to the PDCP header after performing ciphering, attaches the PDCP header, and transfers the PDCP PDU to the RLC layer (1i-50).

The compression process is an important procedure to reduce an overhead during data transmission. The RLC layer performs the functions as described above with reference to FIG. 1D, attaches an RLC header 1i-60, and transfers the IP packet to the MAC layer. The MAC layer that has received this performs the functions as described above with reference to FIG. 1D, and attaches a MAC header 1i-65.

FIG. 1J is a diagram illustrating a (1-3)-th embodiment of a receiver end PDCP layer in which a receiver end introduces a new layer for processing a QoS for each IP flow and processes an IP packet according to an embodiment of the disclosure.

The PDCP layer on the receiver side receives data from an RLC layer, if the (1-2)-th condition is satisfied, the PDCP layer performs the (1-2)-th operation, and if the (2-2)-th condition is satisfied, the PDCP layer performs the (2-2)-th operation.

As described above, the (1-2)-th condition corresponds to a case where a 1-bit indicator of a PDCP header of a received PDCP PDU indicates that a PDAP header exists, a case where it can be indirectly known that the PDAP header is attached through recognizing that the terminal is connected to a 5G core network (5G-CN), or a case where the PDAP header is always attached.

Further, the (2-2)-th condition corresponds to a case where the 1-bit indicator of the PDCP header of the received PDCP PDU indicates that the PDAP header does not exist, or a case where it can be indirectly known that the PDAP header is not attached through recognizing that the terminal is connected to an enhanced packet core (EPC, or LTE EPC).

As described above, the (1-2)-th operation indicates an operation in which the PDCP layer removes the PDCP header, performs deciphering of the PDCP SDU, recovers the original IP header 1*j*-55 by performing restoration of the compressed IP header 1*j*-50, and transfers the data to a PDAP layer (existence of the PDAP header may be indicated to the PDAP layer).

Further, the (2-2)-th operation indicates an operation in which the PDCP layer removes the PDCP header, performs deciphering of the PDCP SDU, recovers the original IP header 1*j*-55 by performing restoration of the compressed IP header 1*j*-50, and transfers the data to the PDAP layer (nonexistence of the PDAP header may be indicated to the PDAP layer).

As described above, if the PDAP header exists, the PDAP layer analyzes the PDAP header, identifies the QoS flow ID, performs mapping of the QoS flow ID onto the IP flow, and transfers the data 1*j*-60 to the EPC or 5G-CN. The PDCP layer may indicate existence/nonexistence of the PDAP header to the PDAP layer. It may not be necessary to indicate the existence/nonexistence of the PDAP header if the PDAP header is always attached or the existence/nonexistence of the PDAP header can be indirectly known through connection of the terminal to the EPC or 5G-CN. In this case, if the PDAP header exists, the PDAP layer may analyze the PDAP header, starting from the rear part of the PDCP SDU received from the PDCP layer in order to analyze the PDAP header.

In the (1-4)-th embodiment of the disclosure, if it is necessary to attach a PDAP header to a received IP packet, the new PDAP layer inserts a QoS flow ID or other necessary information into the PDAP header by applying mapping information between an IP flow predetermined in a network and a QoS flow. Then, the new PDAP layer may attach the PDAP header to the rear of the IP packet to be transferred to the PDCP layer (1*i*-45).

In the disclosure, if the IP packet is received from the PDAP layer, the PDCP layer performs the following operations to process the IP packet supporting various QoS services.

The PDCP layer on the transmitter side receives data from the PDAP layer, if the (1-1)-th condition is satisfied, the PDCP layer performs the (1-1)-th operation, and if the (2-1)-th condition is satisfied, the PDCP layer performs the (2-1)-th operation.

As described above, the (1-1)-th condition corresponds to a case where the PDCP layer can be indicated by the PDAP layer or know that the PDAP header is attached (e.g., the PDAP header may be always attached), or a case where the PDCP layer can indirectly know that the PDAP header is attached through recognizing that the terminal is connected to a 5G core network (5G-CN).

Further, the (2-1)-th condition corresponds to a case where the PDCP layer can be indicated by the PDAP layer or know that the PDAP header is not attached, or a case where the PDCP layer can indirectly know that the PDAP header is not attached through recognizing that the terminal is connected to an enhanced packet core (EPC, or LTE EPC).

As described above, the (1-1)-th operation indicates an operation in which the PDCP layer performs header compression with respect to the IP header (1*i*-55), performs ciphering with the PDAP header included, attaches the PDCP header, and transfers a PDCP PDU to the RLC layer (1*i*-50).

Further, the (2-1)-th operation indicates an operation in which the PDCP layer performs header compression with respect to the IP header (1*i*-55), attaches the PDCP header after performing ciphering, and transfers a PDCP PDU to the RLC layer (1*i*-50).

The compression process is an important procedure to reduce an overhead during data transmission. The RLC layer performs the functions as described above with reference to FIG. 1D, attaches an RLC header 1*g*-60, and transfers the IP packet to the MAC layer. The MAC layer that has received this performs the functions as described above with reference to FIG. 1D, and attaches a MAC header 1*g*-65.

FIG. 1J is a diagram illustrating a (1-4)-th embodiment of a receiver end PDCP layer in which a receiver end introduces a new layer for processing a QoS for each IP flow and processes an IP packet according to an embodiment of the disclosure.

The PDCP layer on the receiver side receives data from an RLC layer, if the (1-2)-th condition is satisfied, the PDCP layer performs the (1-2)-th operation, and if the (2-2)-th condition is satisfied, the PDCP layer performs the (2-2)-th operation.

As described above, the (1-2)-th condition corresponds to a case where it can be indirectly known that the PDAP header is attached through recognizing that the terminal is connected to a 5G core network (5G-CN), or a case where the PDAP header is always attached.

Further, the (2-2)-th condition corresponds to a case where it can be indirectly known that the PDAP header is not attached through recognizing that the terminal is connected to an enhanced packet core (EPC, or LTE EPC).

As described above, the (1-2)-th operation indicates an operation in which the PDCP layer removes the PDCP header, performs deciphering of the PDCP SDU, recovers the original IP header 1*j*-55 by performing restoration of the compressed IP header 1*j*-50, and transfers the data to a PDAP layer (existence of the PDAP header may be indicated to the PDAP layer).

Further, the (2-2)-th operation indicates an operation in which the PDCP layer removes the PDCP header, performs deciphering of the PDCP SDU, recovers the original IP header 1*j*-55 by performing restoration of the compressed IP header 1*j*-50, and transfers the data to the PDAP layer (nonexistence of the PDAP header may be indicated to the PDAP layer).

As described above, if the PDAP header exists, the PDAP layer analyzes the PDAP header 1*h*-55, identifies the QoS flow ID, performs mapping of the QoS flow ID onto the IP flow, and transfers the data 1*h*-60 to the EPC or 5G-CN. The PDCP layer may indicate existence/nonexistence of the PDAP header to the PDAP layer. It may not be necessary to indicate the existence/nonexistence of the PDAP header if the PDAP header is always attached or the existence/nonexistence of the PDAP header can be indirectly known through connection of the terminal to the EPC or 5G-CN. In this case, if the PDAP header exists, the PDAP layer may analyze the PDAP header, starting from the rear part of the PDCP SDU received from the PDCP layer in order to analyze the PDAP header.

Figure 1K:
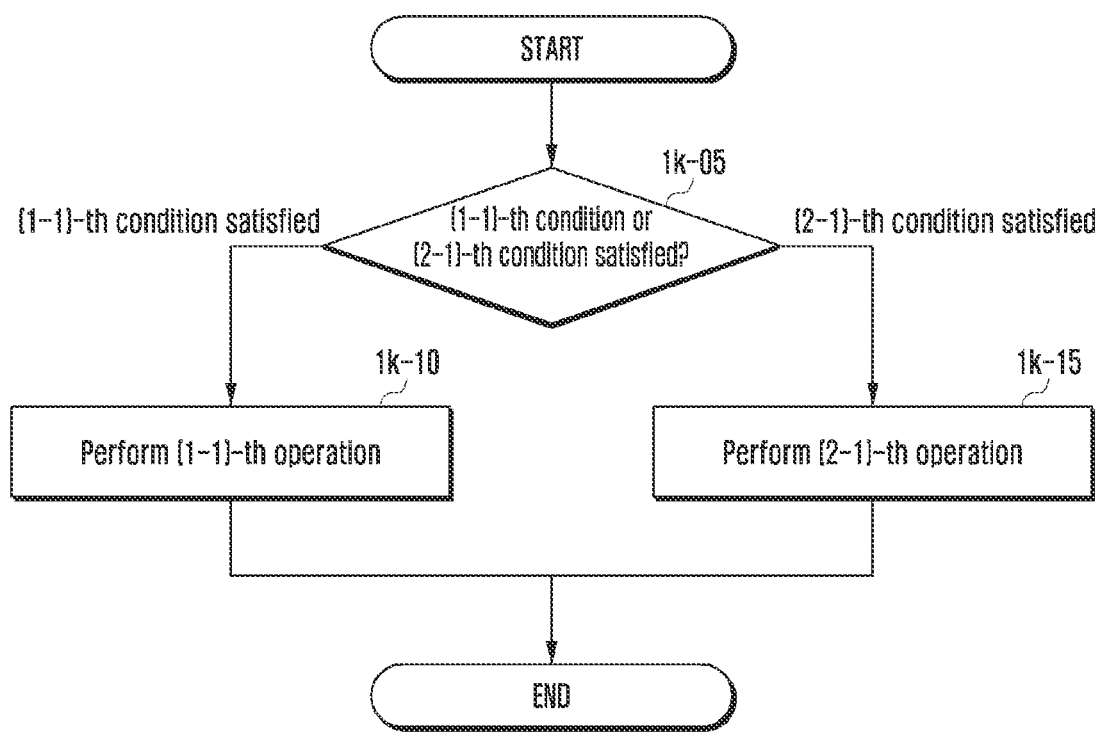
FIG. 1K is a diagram illustrating a transmission operation of a terminal according to an embodiment of the disclosure.

FIG. 1K is a diagram illustrating a transmission operation of a terminal according to an embodiment of the disclosure.

Referring to FIG. 1K, when a terminal transmits data, that is, uplink data, a PDCP layer may perform an operation in accordance with the (1-1)-th embodiment, the (1-2)-th embodiment, the (1-3)-th embodiment, or the (1-4)-th embodiment as described above. The PDCP layer of the terminal identifies whether the (1-1)-th condition or the (2-1)-th condition is satisfied at operation 1$k$-05, and if the (1-1)-th condition is satisfied, the PDCP layer performs the (1-1)-th operation at operation 1$k$-10, whereas if the (2-1)-th condition is satisfied, the PDCP layer performs the (2-1)-th operation at operation 1$k$-15.

Figure 1L:
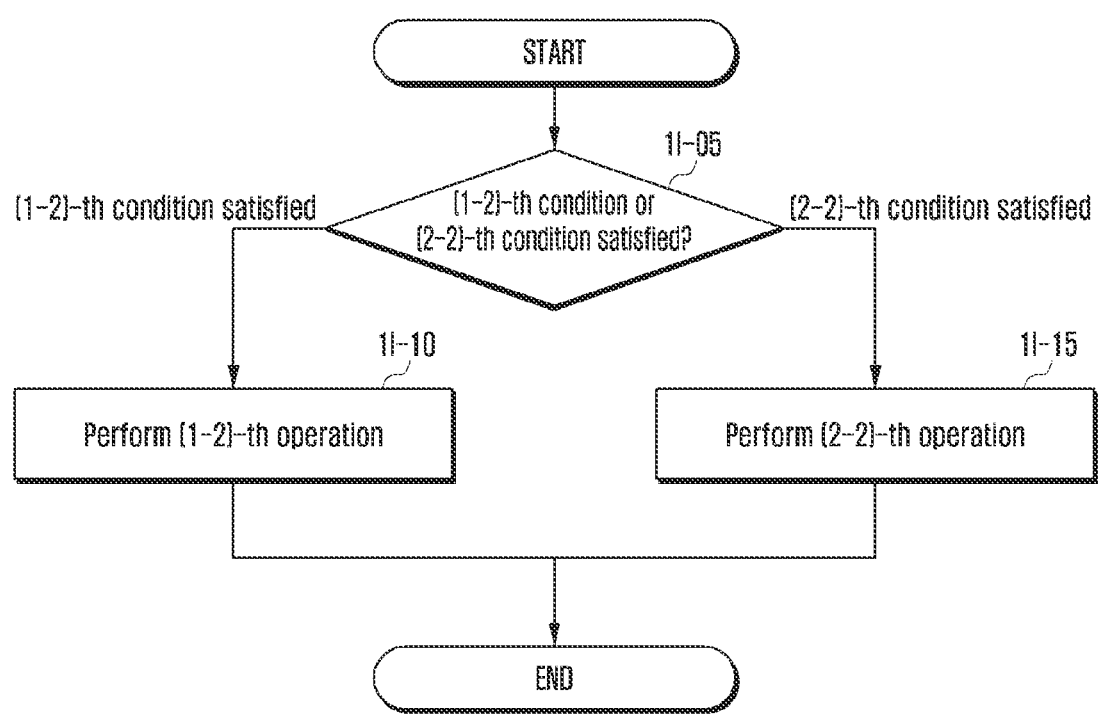
FIG. 1L is a diagram illustrating a reception operation of a terminal according to an embodiment of the disclosure.

FIG. 1L is a diagram illustrating a reception operation of a terminal according to an embodiment of the disclosure.

Referring to FIG. 1L, when a terminal receives data, that is, downlink data, a PDCP layer may perform an operation in accordance with the (1-1)-th embodiment, the (1-2)-th embodiment, the (1-3)-th embodiment, or the (1-4)-th embodiment as described above. The PDCP layer of the terminal identifies whether the (1-2)-th condition or the (2-2)-th condition is satisfied at operation 1$l$-05, and if the (1-2)-th condition is satisfied, the PDCP layer performs the (1-2)-th operation at operation 1$l$-10, whereas if the (2-2)-th condition is satisfied, the PDCP layer performs the (2-2)-th operation at operation 1$l$-15.

Figure 1M:
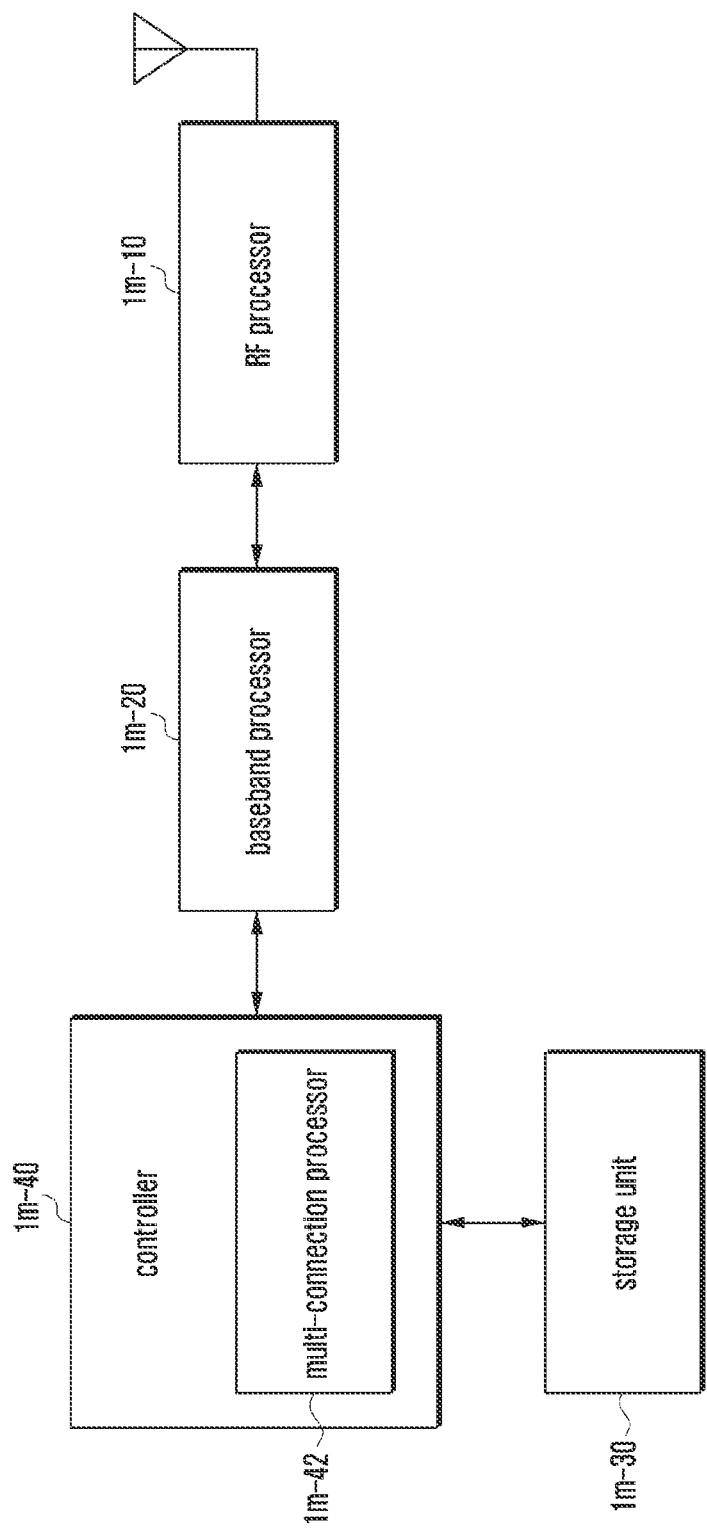
FIG. 1M is a diagram illustrating the structure of a terminal according to an embodiment of the disclosure.

FIG. 1M is a diagram illustrating the structure of a terminal according to an embodiment of the disclosure.

Referring FIG. 1M, the terminal includes a radio frequency (RF) processor 1$m$-10, a baseband processor 1$m$-20, a storage unit 1$m$-30, and a controller 1$m$-40.

The RF processor 1$m$-10 performs a function for transmitting and receiving a signal through a radio channel, such as signal band conversion and amplification. That is, the RF processor 1$m$-10 performs up-conversion of a baseband signal provided from the baseband processor 1$m$-20 into an RF-band signal to transmit the converted signal to an antenna, and performs down-conversion of the RF-band signal received through the antenna into a baseband signal. For example, the RF processor 1$m$-10 may include a transmission filter, a reception filter, an amplifier, a mixer, an oscillator, a digital-to-analog converter (DAC), and an analog-to-digital converter (ADC). Although only one antenna is illustrated in the drawing, the terminal may be provided with a plurality of antennas. Further, the RF processor 1$m$-10 may include a plurality of RF chains. Further, the RF processor 1$m$-10 may perform beamforming. For the beamforming, the RF processor 1$m$-10 may adjust phases and sizes of signals transmitted or received through the plurality of antennas or antenna elements. Further, the RF processor may perform multiple input multiple output (MIMO), and may receive several layers during performing of a MIMO operation. The RF processor 1$m$-10 may perform reception beam sweeping through proper configuration of the plurality of antennas or antenna elements under the control of the controller, or may control the direction and the beam width of the reception beam so that the reception beam is synchronized with the transmission beam.

The baseband processor 1$m$-20 performs conversion between a baseband signal and a bit string in accordance with the physical layer standard of the system. For example, during data transmission, the baseband processor 1$m$-20 generates complex symbols by encoding and modulating a transmitted bit string. Further, during data reception, the baseband processor 1$m$-20 restores a received bit string by demodulating and decoding the baseband signal provided from the RF processor 1$m$-10. For example, in a case of following an OFDM method, during data transmission, the baseband processor 1$m$-20 generates complex symbols by encoding and modulating a transmitted bit string, performs mapping of the complex symbols on subcarriers, and then configures OFDM symbols through the inverse fast Fourier transform (IFFT) operation and cyclic prefix (CP) insertion. Further, during data reception, the baseband processor 1$m$-20 divides the baseband signal provided from the RF processor 1$m$-10 in the unit of OFDM symbols, restores the signals mapped on the subcarriers through the fast Fourier transform (FFT) operation, and then restores the received bit string through demodulation and decoding.

The baseband processor 1$m$-20 and the RF processor 1$m$-10 transmit and receive the signals as described above. Accordingly, the baseband processor 1$m$-20 and the RF processor 1$m$-10 may be called a transmitter, a receiver, a transceiver, or a communication unit. Further, in order to support different radio connection technologies, at least one of the baseband processor 1$m$-20 and the RF processor 1$m$-10 may include a plurality of communication modules. Further, in order to process signals of different frequency bands, at least one of the baseband processor 1$m$-20 and the RF processor 1$m$-10 may include different communication modules. For example, the different radio connection technologies may include an LTE network and an NR network. Further, the different frequency bands may include super high frequency (SHF) (e.g., 2.1 mHz or 1 mHz) band and millimeter wave (mmWave) (e.g., 60 GHz) band.

The storage unit 1$m$-30 stores therein a basic program for an operation of the terminal, application programs, and data of setup information. The storage unit 1$m$-30 provides stored data in accordance with a request from the controller 1$m$-40.

The controller 1$m$-40 controls the whole operation of the terminal. For example, the controller 1$m$-40 transmits and receives signals through the baseband processor 1$m$-20 and the RF processor 1$m$-10. Further, the controller 1$m$-40 records or reads data in or from the storage unit 1$m$-30. For this, the controller 1$m$-40 may include at least one processor. For example, the controller 1$m$-40 may include a communication processor (CP) performing a control for communication and an application processor (AP) controlling an upper layer, such as an application program. Further, the controller 1$m$-40 may include a multi-connection processor 1$m$-42 for supporting multi-connection.

Figure 1N:
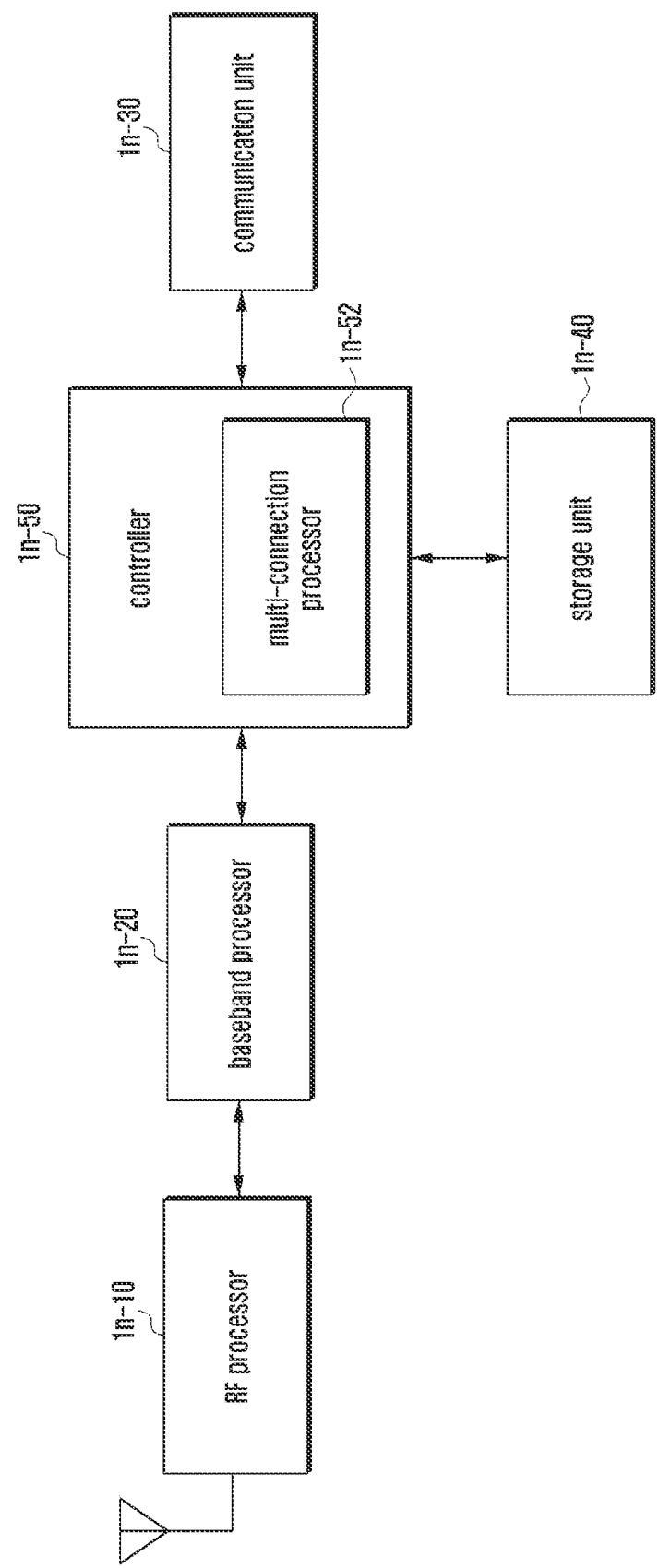
FIG. 1N is a diagram illustrating a block configuration of a transmission reception point (TRP) in a wireless communication system according to an embodiment of the disclosure.

FIG. 1N is a diagram illustrating a block configuration of a TRP in a wireless communication system according to an embodiment of the disclosure.

Referring to FIG. 1N, the base station includes an RF processor 1$n$-10, a baseband processor 1$n$-20, a backhaul communication unit 1$n$-30, a storage unit 1$n$-40, and a controller 1$n$-50.

The RF processor 1$n$-10 performs a function for transmitting and receiving a signal through a radio channel, such as signal band conversion and amplification. That is, the RF processor 1$n$-10 performs up-conversion of a baseband signal provided from the baseband processor 1$n$-20 into an RF-band signal to transmit the converted signal to an antenna, and performs down-conversion of the RF-band signal received through the antenna into a baseband signal. For example, the RF processor 1n-10 may include a transmission filter, a reception filter, an amplifier, a mixer, an oscillator, a DAC, and an ADC. Although only one antenna is illustrated in the drawing, the first connection node may be provided with a plurality of antennas. Further, the RF processor 1n-10 may include a plurality of RF chains. Further, the RF processor 1n-10 may perform beamforming. For the beamforming, the RF processor 1n-10 may adjust phases and sizes of signals transmitted or received through the plurality of antennas or antenna elements. Further, the RF processor may perform down MIMO operation through transmission of one or more layers.

The baseband processor 1n-20 performs conversion between a baseband signal and a bit string in accordance with the physical layer standard of the first radio connection technology. For example, during data transmission, the baseband processor 1n-20 generates complex symbols by encoding and modulating a transmitted bit string. Further, during data reception, the baseband processor 1n-20 restores a received bit string by demodulating and decoding the baseband signal provided from the RF processor 1n-10. For example, in a case of following an OFDM method, during data transmission, the baseband processor 1n-20 generates complex symbols by encoding and modulating a transmitted bit string, performs mapping of the complex symbols on subcarriers, and then configures OFDM symbols through the IFFT operation and CP insertion. Further, during data reception, the baseband processor 1n-20 divides the baseband signal provided from the RF processor 1n-10 in the unit of OFDM symbols, restores the signals mapped on the subcarriers through the FFT operation, and then restores the received bit string through demodulation and decoding. The baseband processor 1n-20 and the RF processor 1n-10 transmit and receive the signals as described above. Accordingly, the baseband processor 1n-20 and the RF processor 1n-10 may be called a transmitter, a receiver, a transceiver, or a wireless communication unit.

The communication unit 1n-30 provides an interface for performing communication with other nodes in the network.

The storage unit 1n-40 stores therein a basic program for an operation of the main base station, application programs, and data of setup information. In particular, the storage unit 1n-40 may store information on a bearer allocated to the connected terminal and the measurement result reported from the connected terminal. Further, the storage unit 1n-40 may store information that becomes a basis of determination whether to provide or suspend a multi-connection to the terminal. Further, the storage unit 1n-40 provides stored data in accordance with a request from the controller 1n-50.

The controller 1n-50 controls the whole operation of the main base station. For example, the controller 1n-50 transmits and receives signals through the baseband processor 1n-20 and the RF processor 1n-10 or through the backhaul communication unit 1n-30. Further, the controller 1n-50 records or reads data in or from the storage unit 1n-40. For this, the controller 1n-50 may include at least one processor. Further, the controller 1n-50 may include a multi-connection processor 1n-52 for supporting multi-connection.

SECOND EMBODIMENT

Figure 2A:
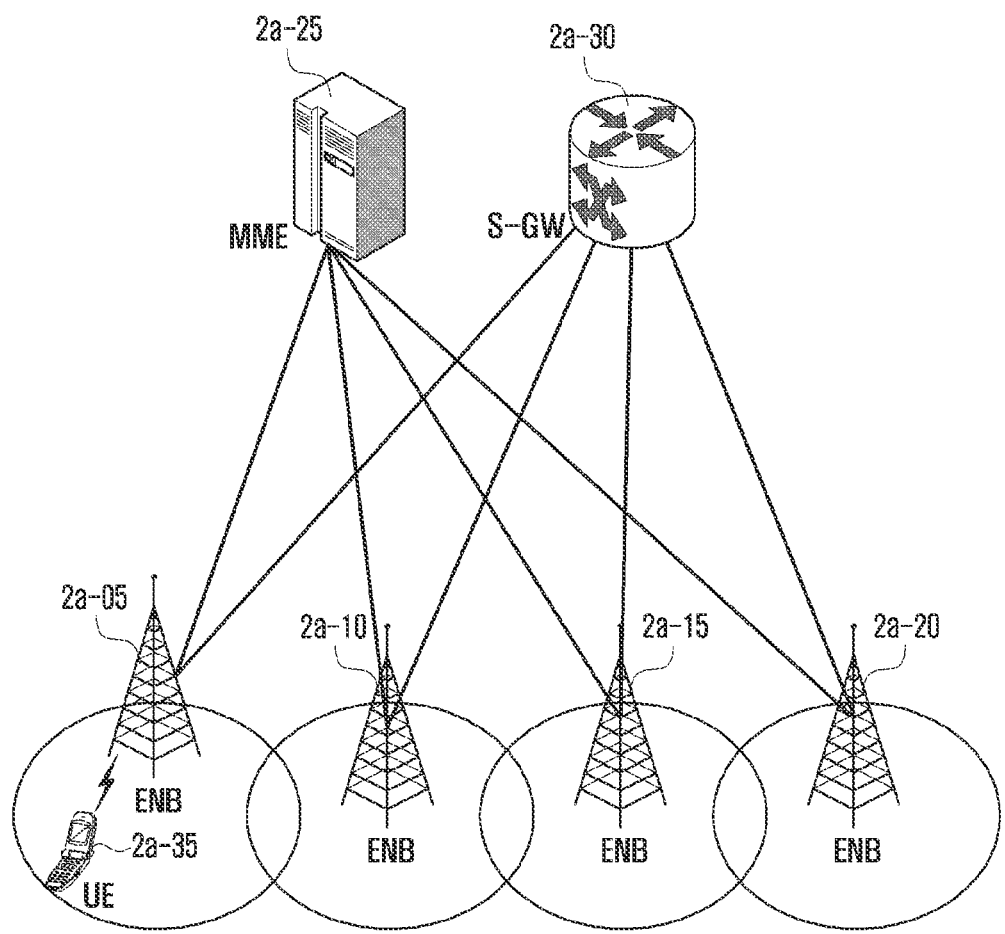
FIG. 2A is a diagram illustrating the structure of an existing LTE system according to an embodiment of the disclosure.

FIG. 2A is a diagram illustrating the structure of an existing LTE system according to an embodiment of the disclosure.

Referring to FIG. 2A, as illustrated, a wireless communication system is composed of several eNBs 2a-05, 2a-10, 2a-15, and 2a-20, a MME 2a-25, and a S-GW 2a-30. User equipment (hereinafter referred to as "UE" or "terminal") 2a-35 accesses to an external network through the eNBs 2a-05, 2a-10, 2a-15, and 2a-20 and the S-GW 2a-30.

The eNBs 2a-05, 2a-10, 2a-15, and 2a-20 are access nodes of a cellular network, and provide radio accesses to the UEs accessing the network. That is, the eNBs 2a-05, 2a-10, 2a-15, and 2a-20 support connections between the UEs and a core network (CN) by performing scheduling through consolidation of state information, such as a buffer state, an available transmission power state, and a channel state of each UE, in order to service users' traffics. The MME 2a-25 is a device that takes charge of not only mobility management of the terminal 2a-35 but also various kinds of control functions, and is connected to the plurality of eNBs 2a-05, 2a-10, 2a-15, and 2a-20. The S-GW 2a-30 is a device that provides a data bearer. Further, the MME 2a-25 and the S-GW 2a-30 may further perform authentication of the UE accessing to the network and bearer management, and process packets arriving from the eNBs 2a-05, 2a-10, 2a-15, and 2a-20, or process packets to be transferred to the eNBs 2a-05, 2a-10, 2a-15, and 2a-20.

In general, one eNB may transmit and receive multi-carriers over several frequency bands. For example, if a carrier having a forward center frequency of f1 and a carrier having a forward center frequency of f2 are transmitted from the eNB 2a-05, in the related art, one UE transmits/receives data using one of the two carriers. However, the UE having a carrier aggregation capability can simultaneously transmit/receive data through several carriers. The eNB 2a-05, 2a-10, 2a-15, or 2a-20 allocates more carriers to the UE 2a-35 having the carrier aggregation capability according to circumstances, and thus the transmission speed of the UE can be heightened. As described above, aggregation of forward carriers and backward carriers transmitted and received by one eNB is referred to as intra-eNB carrier aggregation (CA). Traditionally, if it is assumed that one forward carrier transmitted by one eNB and one backward carrier received by the eNB constitute one cell, it may be understood that the carrier aggregation is for the UE to transmit/receive data simultaneously through several cells. Through this the maximum transmission speed is increased in proportion to the number of carriers being aggregated.

Hereinafter, in the disclosure, reception of data by the UE through a certain forward carrier or transmission of data by the UE through a certain backward carrier has the same meaning as transmission/reception of data using a control channel and a data channel provided from a cell corresponding to the center frequency and the frequency band featuring the carrier. In the description of the disclosure, the carrier aggregation will be particularly expressed as "setup of a plurality of serving cells", and with respect to the serving cell, the term "primary serving cell (hereinafter, PCell)", "secondary serving cell (hereinafter, SCell)", or "activated serving cell" will be used. The PCell and SCell are terms representing the kind of serving cell set in the UE. There are some different points between PCell and SCell, and for example, PCell always maintains an active state, but SCell repeats an active state and inactive state in accordance with the indication of the eNB. The terminal mobility is controlled around PCell, and it may be understood that SCell is an additional serving cell for data transmission/reception. In embodiments of the disclosure, PCell and SCell mean PCell and SCell defined in the LTE standards 36.331 or 36.321. The terms have the same meanings as those used in an LTE mobile communication system as they are. In the disclosure, the terms "carrier", "component carrier", and "serving cell" are mixedly used.

According to a normal intra-eNB CA, the UE transmits not only hybrid automatic repeat request (HARQ) feedback for PCell and channel state information (CSI) but also HARQ feedback for SCell and CSI through a physical uplink control channel (PUCCH) of PCell. This is to apply the CA operation even with respect to the UE of which uplink simultaneous transmission is not possible. In LTE Rel-13 enhanced CA (eCA), an additional SCell having a PUCCH is defined, and up to 32 carriers can be aggregated. The PUCCH SCell is limited to a serving cell belonging to a mast cell group (MCG). The MCG means a set of serving cells controlled by a master eNB (MeNB) controlling PCell, and the SCG means a set of serving cells controlled by an eNB that is not an eNB controlling PCell, in other words, a secondary eNB (SeNB), controlling only secondary cells (SCells). The eNB notifies the UE whether a specific serving cell belongs to the MCG or SCG in the process of setting the corresponding serving cell. Further, the eNB notifies the UE whether the respective SCell belong to the PCell group or the PUCCH SCell group.

Figure 2B:
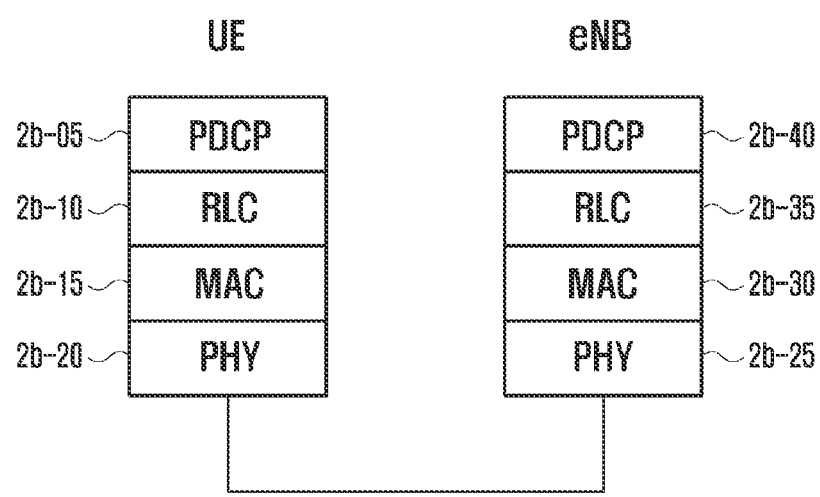
FIG. 2B is a diagram illustrating a radio protocol structure of an existing LTE system according to an embodiment of the disclosure.

FIG. 2B is a diagram illustrating a radio protocol structure in an existing LTE system according to an embodiment of the disclosure.

Referring to FIG. 2B, in UE or an eNB, a radio protocol of an LTE system is composed of a PDCP 2b-05 or 2b-40, a RLC 2b-10 or 2b-35, and a MAC 2b-15 or 2b-30. The PDCP 2b-05 or 2b-40 takes charge of IP header compression/decompression operations. The main functions of the PDCP are summarized as follows.

Header compression and decompression: ROHC only
Transfer of user data
In-sequence delivery of upper layer PDUs at a PDCP reestablishment procedure for an RLC AM
For split bearers in DC (only support for an RLC AM): PDCP PDU routing for transmission and PDCP PDU reordering for reception
Duplicate detection of lower layer SDUs at a PDCP reestablishment procedure for an RLC AM
Retransmission of PDCP SDUs at handover and, for split bearers in DC, of PDCP PDUs at a PDCP data-recovery procedure, for an RLC AM
Ciphering and deciphering
Timer-based SDU discard in an uplink The RLC 2b-10 or 2b-35 reconfigures a PDCP PDU with a proper size and performs an ARQ operation and the like. The main functions of the RLC are summarized as follows.

Transfer of upper layer PDUs
Error correction through an ARQ (only for AM data transfer)
Concatenation, segmentation, and reassembly of RLC SDUs (only for UM and AM data transfer)
Re-segmentation of RLC data PDUs (only for UM and AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM transfer)
RLC reestablishment The MAC 2b-15 or 2b-30 is connected to several RLC layer devices configured in one terminal, and performs multiplexing/demultiplexing of RLC PDUs into/from a MAC PDU. The main functions of the MAC are summarized as follows.

Mapping between logical channels and transport channels
Multiplexing/demultiplexing of MAC SDUs belonging to one or different logical channels into/from TB transferred to/from the physical layer on transport channels
Scheduling information reporting
HARQ function (error correction through HARQ)
Priority handling between logical channels of one UE
Priority handling between UEs by means of dynamic scheduling
MBMS service identification
Transport format selection
padding The physical layer 2b-20 or 2b-25 performs channel coding and modulation of upper layer data, or performs demodulation and channel decoding of the OFDM symbols received on the radio channel to transfer the demodulated and channel-decoded symbols to an upper layer.

Although not illustrated in the drawing, radio resource control (hereinafter referred to as "RRC") layers exist above PDCP layers of the UE and the eNB, and the RRC layers may transmit/receive setup control messages related to accesses and measurement for RRC.

Figure 2C:
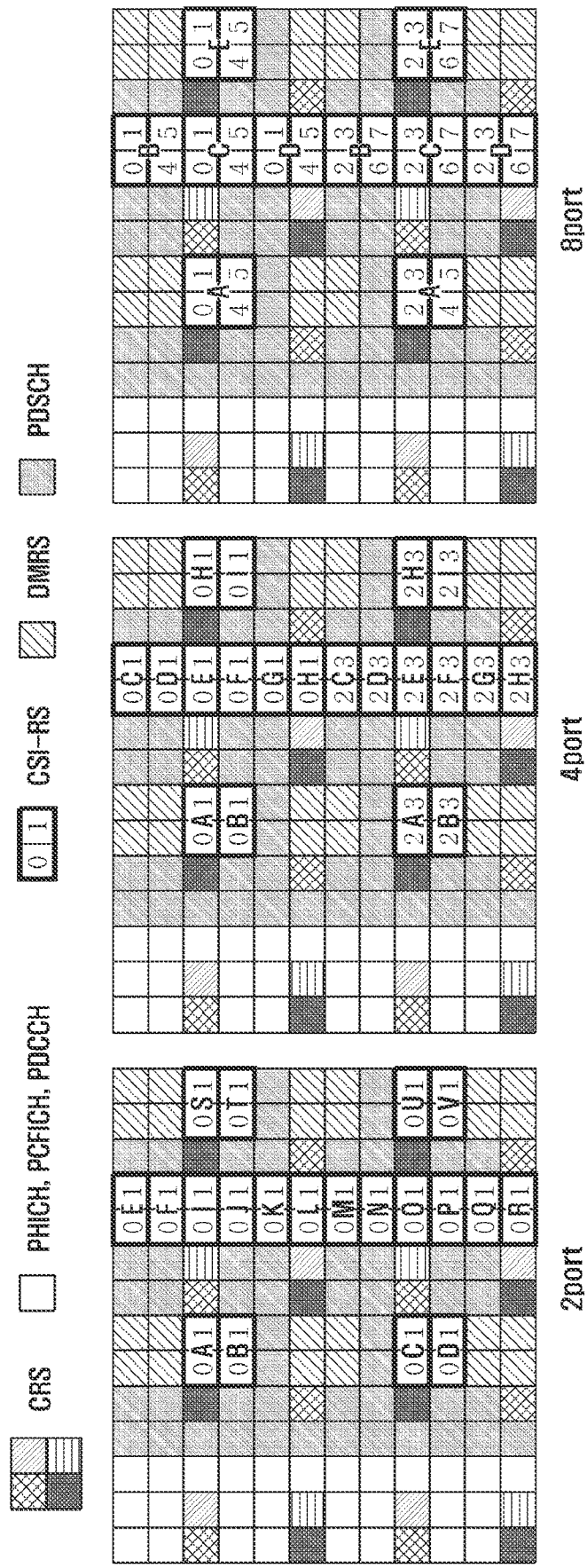
FIG. 2C is a diagram illustrating 2, 4, or 8 antenna port channel state information reference signal (CSI-RS) transmission using 1 subframe that is a minimum unit capable of scheduling to a downlink and a radio resource of 1 resource block (RB) in an existing LTE system according to an embodiment of the disclosure.

FIG. 2C is a diagram illustrating 2, 4, or 8 antenna port CSI-RS transmission using 1 subframe that is a minimum unit capable of scheduling to a downlink and a radio resource of 1 resource block (RB) in an existing LTE system according to an embodiment of the disclosure.

Referring to FIG. 2C, a radio resource is composed of one subframe on a time axis, and is composed of one RB on a frequency axis. The radio resource is composed of 12 subcarriers in a frequency domain, and is composed of 14 OFDM symbols in a time domain, so that the radio resource has 168 inherent frequencies and time locations in total. In LTE/LTE-A, each inherent frequency and time location as illustrated in FIG. 2C are referred to as a resource element (RE).

On the radio resources as illustrated in FIG. 2C, different kinds of signals as follows may be transmitted.

1. Cell specific reference signal (CRS): This is a reference signal transmitted for all UEs belonging to one cell.
2. Demodulation reference signal (DMRS): This is a reference signal transmitted for a specific UE, and is used to perform channel estimation for restoring information carried on a PDSCH. One DMRS port adopts the same precoding as that of a PDSCH layer connected thereto to be transmitted. A UE that intends to receive a specific layer of the PDSCH performs the channel estimation through reception of the EMRS port connected to the corresponding layer, and restores the information carried on the corresponding layer using the channel estimation.
3. Physical downlink shared channel (PDSCH): This is a data channel transmitted to a downlink, and is used for an eNB to transmit traffics to the UE. The PDSCH is transmitted using the RE through which the reference signal is not transmitted in a data area.
4. CSI-RS: This is a reference signal transmitted for UEs belonging to one cell, and is used to measure the channel state. A plurality of CSI-RSs may be transmitted to one cell.
5. Zero power CSI-RS (ZP-CSI-RS): This means that no signal is actually transmitted at a location where a CSI-RS is transmitted.
6. Interference measurement resource (IMR): This corresponds to a location where a CSI-RS is transmitted, and one or more of FIGS. 2A to 2J may be set as the IMR.

A UE performs interference measurement on the assumption that all signals received in REs set as the IMR are interferences.

7. Other control channels (physical hybrid-ARQ indicator channel (PHICH), physical control format indicator channel (PCFICH), and physical downlink control channel (PDCCH)): These are used for a UE to provide control information required to receive a PDSCH or to transmit ACK/NACK for operating a HARQ for uplink data transmission.

In addition to the above-described signals, an LTE-A system may configure a zero power CSI-RS so that the CSI-RS transmitted by different eNBs can be received in UEs in the corresponding cell without interference. The zero power CSI-RS (muting) may be applied at a location where the CSI-RS can be transmitted, and in general, the UE receives a traffic signal by jumping over the corresponding radio resource. In the LTE-A system, the zero power CSI-RS (muting) may be called "muting" as another term. This is because, due to its characteristics, the zero power CSI-RS (muting) is applied to the location of the CSI-RS, and no transmission power is transmitted.

In FIG. 2C, the CSI-RS may be transmitted using a part of locations indicated as A, B, C, D, E, F, G, H, I, and J in accordance with the number of antennas for transmitting the CSI-RS. Further, the muting may also be applied to a part of the locations indicated as A, B, C, D, E, F, G, H, I, and J. In particular, the CSI-RS may be transmitted to 2, 4, or 8 REs in accordance with the number of transmission antenna ports. If the number of antenna ports is 2, the CSI-RS is transmitted to a half of a specific pattern as illustrated in FIG. 2C, and if the number of antenna ports is 4, the CSI-RS is transmitted to the whole of the specific pattern. If the number of antenna ports is 8, the CSI-RS is transmitted using two patterns. In contrast, in a case of muting, it is always performed in the unit of one pattern. That is, the muting may be applied to a plurality of patterns, but it cannot be applied to only a part of one pattern if it does not overlap the location of the CSI-RS. However, the muting may be applied to only a part of one pattern only in the case where the location of the muting and the location of the muting overlap each other.

Further, the UE may be allocated with CSI-IM (or IMR) together with the CSI-RS, and the resource of the CSI-IM has the same resource structure and location as those of the CSI-RS supporting 4 ports. The CSI-IM is a resource for a UE that receives data from one or more eNBs to accurately measure interference from an adjacent eNB. For example, if it is desired to measure the amount of interference when the adjacent eNB transmits data and the amount of interference when the adjacent eNB does not transmit the data, the eNB may configure the CSI-RS and two CSI-IM resources and may effectively measure the amount of interference of the adjacent eNB in a manner that the adjacent eNB always transmits a signal on one CSI-IM and the adjacent eNB always transmits no signal on the other CSI-IM.

In the LTE-A system, the eNB may notify the UE of CSI-RS configuration through upper layer signaling. The CSI-RS configuration includes an index of the CSI-RS configuration, the number of ports included in the CSI-RS, a transmission cycle of the CSI-RS, transmission offset, CSI-RS resource configuration, CSI-RS scrambling ID, and quasi co-location (QCL) information.

In a case of transmitting the CSI-RSs for two antenna ports, two REs connected on time axis transmit signals of the respective antenna ports, and the respective antenna port signals are code-division-multiplexed (CDM) through an orthogonal code. Further, in a case of transmitting the CSI-RSs for four antenna ports, in addition to the CSI-RSs for two antenna ports, signals for the remaining two antenna ports are transmitted in the same method using the two further REs. In a case of transmitting the CSI-RSs for 8 antenna ports, signals are transmitted in the same manner. In a case of transmitting 12 and 16 CSI-RSs of which the number is larger than 8, 12 and 16 CSI-RSs are transmitted by combining locations where existing 4 and 8 CSI-RSs are transmitted through RRC configuration. In other words, in a case of transmitting 12 CSI-RSs, one 12-port CSI-RS is transmitted through binding of three 4-port CSI-RS transmission locations, whereas in a case of transmitting 16 CSI-RSs, one 16-port CSI-RS is transmitted through binding of two 8-port CSI-RS transmission locations. Further, as compared with the existing CSI-RS transmission of not larger than 8 ports, the 12 and 16-port CSI-RS transmission is additionally different from the existing CSI-RS transmission on the point that a CDM having a size of 4 can be supported. The existing CSI-RSs of not larger than 8 ports can use the whole power for the CSI-RS transmission by supporting power boosting up to 6 dB at maximum based on 8 ports through overlapping the CSI-RS two ports and two time symbols to be transmitted to support CDM2. However, in a case of 12-port or 16-port CSI-RSs, the whole power is unable to be used for the CSI-RS transmission through combination of CDM2 and 6 dB, and in such a case, CDM4 is supported to help usage of the whole power.

Figure 2D:
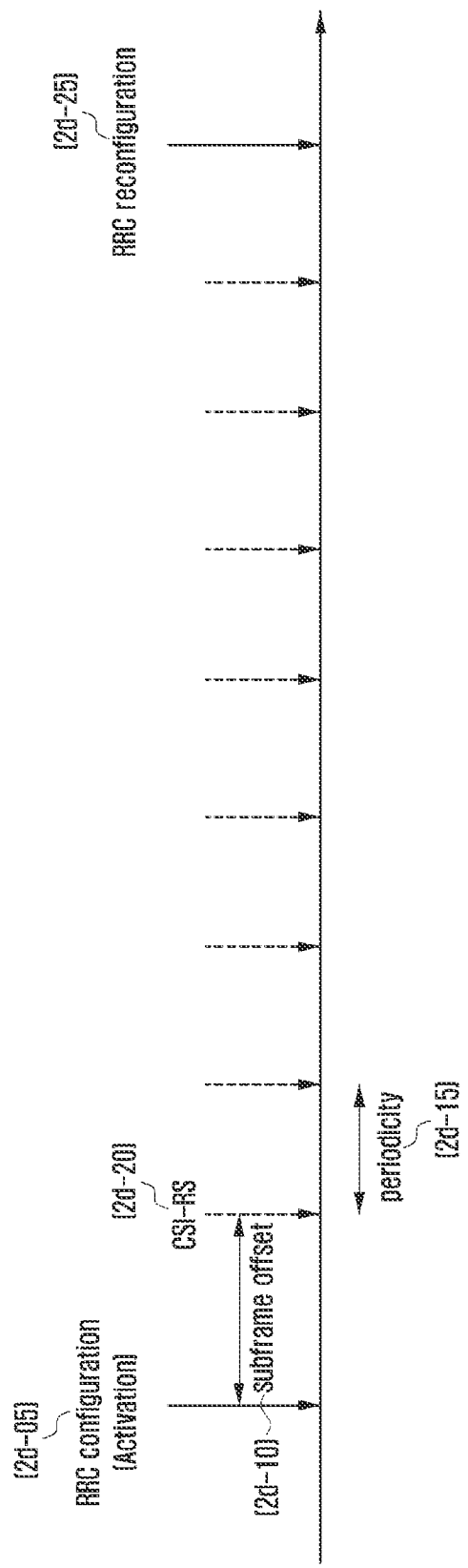
FIG. 2D is a diagram explaining periodic CSI-RS configuration and operation in an existing LTE system according to an embodiment of the disclosure.

FIG. 2D is a diagram explaining periodic CSI-RS configuration and operation in an existing LTE system according to an embodiment of the disclosure.

Referring to FIG. 2D, an eNB configures periodic CSI-RSs to UEs through an RRC message (2*d*-05). The CSI-RS configuration includes an index of the CSI-RS configuration, the number of antenna ports included in the CSI-RS, a transmission cycle of the CSI-RS, transmission offset, CSI-RS resource configuration, CSI-RS scrambling ID, and QCL information. In a case of an existing LTE UE, aperiodic CSI-RS transmission is not supported, and thus the eNB should always transmit a periodic CSI-RS to make the UE report CSI.

FIG. 3 illustrates an RRC field making CSI-RS configuration, and in detail, it indicates RRC configuration to support periodic CSI-RS in a CSI process.

The CSI-RS process is necessary to transfer channel information of eNBs to a serving cell if several eNBs for supporting coordinated multipoint (CoMP) exist, and at present, maximally four can be supported. As shown in FIG. 3, the configuration for channel state report may be classified into four kinds based on the periodic CSI-RS in the CSI process. CSI-RS config is to configure the frequency and time location of a CSI-RS RE. Here, it is configured how many ports the corresponding CSI-RS has through antenna number configuration. Resource config configures an RE location in an RB, and subframe config configures a subframe period 2*d*-15 and offset 2*d*-10.

The eNB transfers CSI-RS 2*d*-20 through a corresponding resource to match the configured subframe config, and the UE receives the CSI-RS periodically transmitted. Further, the UE reports a measured CSI-RS value in accordance with CSI-RS report conditions configured from the eNB. As the report method, a periodic or aperiodic report method may be used.

The above-described process continues until the eNB changes the configured value through RRC reconfiguration 2*d*-25.

Figure 2E:
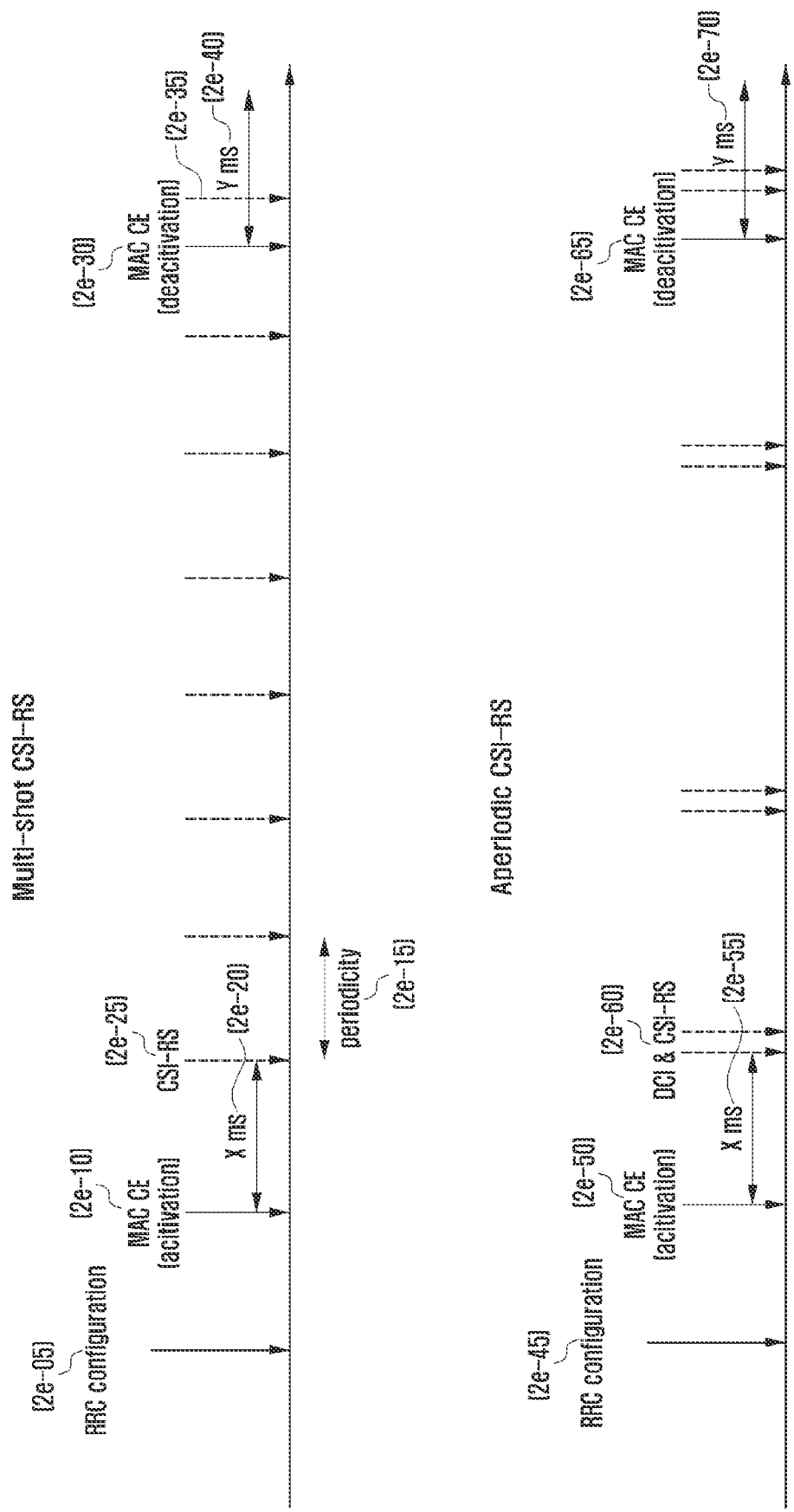
FIG. 2E is a diagram explaining multi-shot CSI-RS, aperiodic CSI-RS configuration, and activation/deactivation operations considered according to an embodiment of the disclosure.

FIG. 2E is a diagram explaining multi-shot CSI-RS, aperiodic CSI-RS configuration, and activation/deactivation operations according to an embodiment of the disclosure.

In a case of multi-shot CSI-RS, an eNB configures periodic CSI-RSs to UEs through an RRC message (2e-05) having a periodicity 2e-15. The CSI-RS configuration includes an index of the existing CSI-RS configuration, the number of antenna ports included in the CSI-RS, a transmission cycle of the CSI-RS, transmission offset, CSI-RS resource configuration, CSI-RS scrambling ID, and QCL information. Further, the CSI-RS configuration may include an indication indicating that the CSI-RS configuration is for the multi-shot CSI-RS. Thereafter, the eNB indicates what resource among CSI-RS resources configured through a MAC control element (CE) is actually activated (2e-10). As described above with reference to FIG. 2C, the CSI-RSs may be transmitted using a part of 1 to 8 indicated locations in accordance with the number of antennas for transmitting the CSI-RSs. If a CSI-RS activation resource is indicated through a MAC CE, the UE performs a CSI-RS activation (CSI-RS reception) (2e-25) after X ms (e.g., 8 ms) (2e-20). Accordingly, since the UE proceeds with the corresponding operation after X ms from the time when the MAC CE is successfully received, the MAC transfers time information on reception of the MAC CE (subframe number during reception of the MAC CE) to a physical layer. The UE receives the CSI-RS in accordance with cycle information configured through an RRC, performs measurement, and then reports the CSI-RS measurement value in accordance with the CSI-RS report method determined from the eNB. As the report method, a periodic or aperiodic report becomes possible. Thereafter, the UE receives CSI-RS deactivation through the MAC CE (2e-30), and deactivates 2e-35 the CSI-RS reception and CSI-RS report after Y ms (e.g., 8 ms) (2e-40) elapses from the reception time. If the CSI-RS is received for Y ms, the above-described information is valid.

On the other hand, in a case of aperiodic CSI-RS, the eNB configures aperiodic CSI-RSs to UEs through an RRC message (2e-45). The CSI-RS configuration may or may not include existing subframe config information, and may further include an indication indicating that the CSI-RS configuration is for the aperiodic CSI-RS. Thereafter, the eNB indicates what resource among CSI-RS resources configured through a MAC CE is actually activated (2e-50). As described above with reference to FIG. 2C, the CSI-RSs may be transmitted using a part of 1 to 8 indicated locations in accordance with the number of antennas for transmitting the CSI-RSs. If a CSI-RS activation resource is indicated through the MAC CE, the UE performs a CSI-RS activation (CSI-RS reception) (2e-60) after X ms (e.g., 8 ms) (2e-55). Accordingly, since the UE proceeds with the corresponding operation after X ms (2e-55) from the time when the MAC CE is successfully received, the MAC transfers time information on reception of the MAC CE (subframe number during reception of the MAC CE) to a physical layer. The above-described operation is distinguished from the existing CSI-RS reception operation on the point that the CSI-RS transmission from the eNB is performed together in the subframe in which the DCI is aperiodically transmitted (2e-60). The UE receives the DCI, receives and measures the CSI-RS transmitted from the same subframe, and then reports the CSI-RS measurement value in accordance with the CSI-RS report method determined from the eNB. As the report method, a periodic or aperiodic report becomes possible. Thereafter, the UE receives CSI-RS deactivation through the MAC CE (2e-65), and deactivates the CSI-RS reception and CSI-RS report after Y ms (e.g., 8 ms) (2e-70) elapses from the reception time. If the CSI-RS is received for Y ms, the above-described information is valid.

Further, for the CSI-RS configuration through the RRC message, the following methods may be used to discriminate different configurations.

1. A method in which identification information indicating multi-shot CSI-RS and aperiodic CSI-RS is included in the existing CSI-RS config IE. If the aperiodic CSI-RS is indicated, subframe config information configured in the CSI-RS config IE is not used.
2. A method in which identification information indicating multi-shot CSI-RS is included in the existing CSI-RS config IE, and a new aperiodic CSI-RS config IE for the aperiodic CSI-RS is additionally introduced. The subframe config information is not included in the aperiodic CSI-RS config IE.
3. A method in which a new CSI-RS config IE is additionally introduced in addition to the existing CSI-RS config IE. An identification for discriminating between the multi-shot CSI-RS and aperiodic CSI-RS config IE is included in the new CSI-RS config IE, and if the aperiodic CSI-RS is indicated, the subframe config information configured in the CSI-RS config IE is not used.

If one or more aperiodic/multi-shot CSI-RS resources are configured in the UE, the eNB may use a newly defined MAC CE to indicate activation/deactivation of the CSI-RS resources. Through this, the activation and deactivation of the CSI-RS resources can be determined more rapidly and adaptively. Further, the configured aperiodic/multi-shot CSI-RS resources may be initialized to a deactivation state after the initial configuration and handover. In the disclosure, two design methods are proposed in accordance with the signal structure of the MAC CE. A first method for MAC CE design is so configured that one MAC CE transmitted by the eNB includes activation/deactivation commands for all serving cells, and a second method for MAC CE design is so configured that one MAC CE includes only an activation/deactivation command for the corresponding serving cell.

Figure 2F:
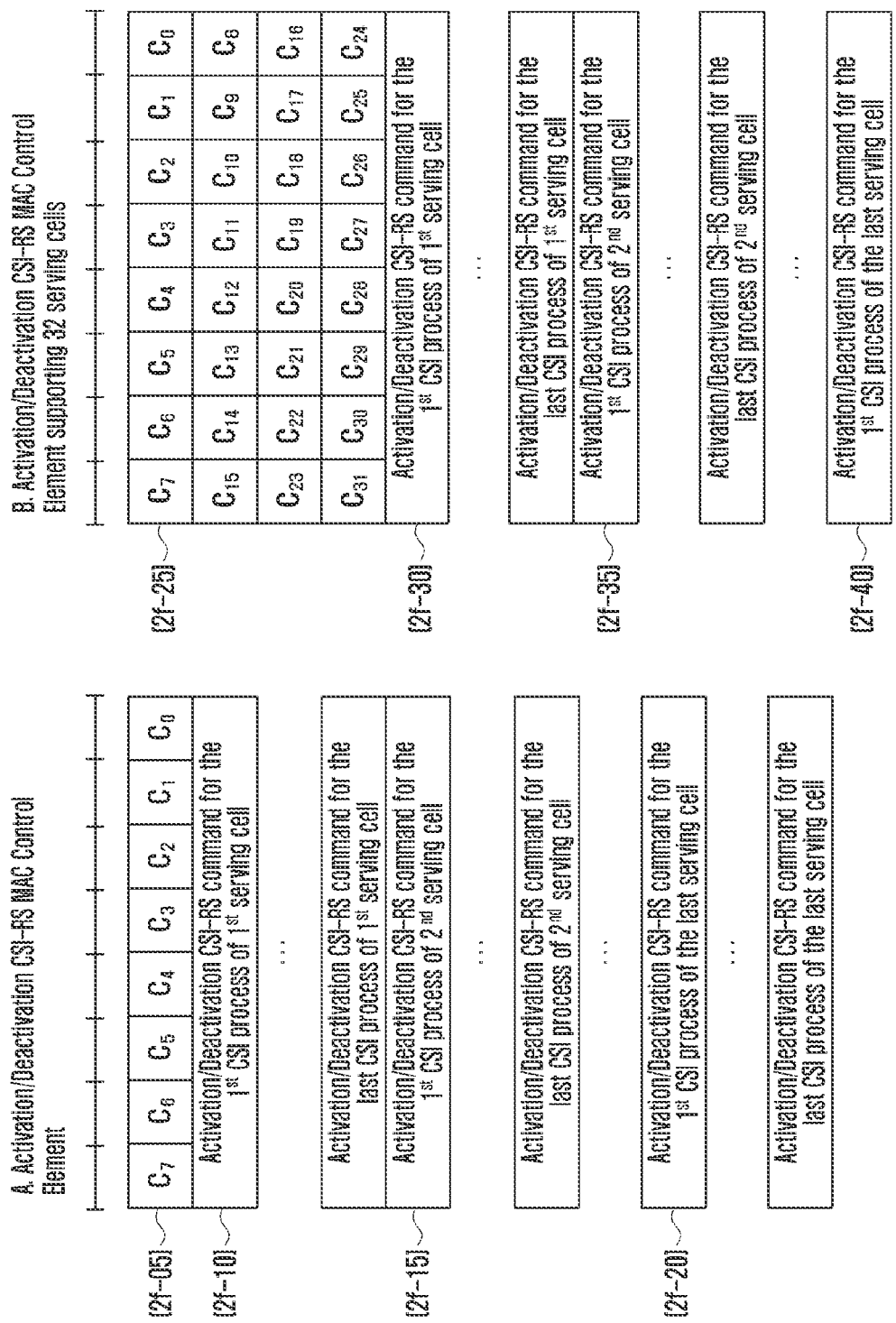
FIG. 2F is a diagram explaining a first method for a medium access control (MAC) control signal indicating activation/deactivation of CSI-RS resources proposed according to an embodiment of the disclosure.

FIG. 2F is a diagram explaining a first method for a MAC control signal indicating activation/deactivation of CSI-RS resources according to an embodiment of the disclosure.

As described above, the first method for MAC CE design is configured so that one MAC CE transmitted by the eNB includes activation/deactivation commands for all serving cells, and may be divided into two models in accordance with the number of serving cells having the configured CSI-RS resources. The first model corresponds to a case where the number of serving cells (serving cells having high indexes in ServCellIndex) having the configured CSI-RS resources is equal to or smaller than 8, and in order to indicate this, 1-byte field (Ci) 2f-05 is used. The second model corresponds to a case where the number of serving cells (serving cells having high indexes in ServCellIndex) having the configured CSI-RS resources is larger than 8, and in order to indicate this, 4-byte fields (Ci) 2f-25 are used. This is to support 32 serving cells at maximum. The great feature of the above-described design is to determine a format based on the index of a serving cell in which a CSI-RS resource or a CSI process is configured.

Further, fields ($R_i$) 2f-10, 2f-15, 2f-20, 2f-30, 2f-35, and 2f-40 are used to indicate what CSI-RS resource is activated/deactivated for each CSI process of the serving cell. The CSI-RS resource command is featured to be indicated only with respect to activated serving cells, and is composed of 1-byte fields (Ri) 2f-45.

The MAC CE for activation/deactivation of the CSI-RS may be defined as follows.

Ci: This field indicates the presence of activation/deactivation CSI-RS command(s) for the serving cell with ServCellIndex i. The Ci field set to "1" indicates that activation/deactivation CSI-RS command(s) for the serving cell with ServCellIndex i are included. The Ci field set to "0" indicates that no activation/deactivation CSI-RS command for the serving cell with ServCellIndex i is included. The number of activation/deactivation CSI-RS command for a serving cell is same as the number of configured CSI-RS processes for the serving cell; and Ri: This field indicates the activation/deactivation status of the CSI-RS resource associated with CSI-RS-ConfigNZPId i for the CSI-RS process.

As described above, Ri corresponds to CSI-RS-ConfigNZPId. That is, it means a CSI-RS resource in which the transmission power allocated with the same frequency in the same CSI process is not 0.

FIG. 2G is a diagram explaining a second method for a MAC control signal indicating activation/deactivation of CSI-RS resources according to an embodiment of the disclosure.

The second method for MAC CE design is configured so that one MAC CE transmitted by the eNB is defined as a serving cell specific, and includes an activation/deactivation command for the corresponding serving cell. In the above-described design, the MAC CE for the CSI-RS activation/deactivation includes only a command for the received serving cell. That is, according to the second method for the MAC CE design, the MAC CE is configured as the serving cell specific, it is not necessary to indicate an index of the serving cell, and only fields ($R_i$) 2g-05 and 2g-10 are used to indicate what CSI-RS resource is activated/deactivated for each CSI process of the serving cell. The CSI-RS resource command is featured to be indicated only with respect to activated serving cells, and is composed of 1-byte fields ($R_i$) 2g-15.

The MAC CE for activation/deactivation of the CSI-RS may be defined as follows.

$R_i$: This field indicates the activation/deactivation status of the CSI-RS resource associated with CSI-RS-ConfigNZPId i for the CSI-RS process.

As described above, $R_i$ corresponds to CSI-RS-ConfigNZPId. That is, it means a CSI-RS resource in which the transmission power allocated with the same frequency in the same CSI process is not 0.

The second method for the MAC CE design may have the advantage of simple structure if the MAC CE can be transmitted from multiple cells. However, if the MAC CE cannot be transmitted from the multiple cells, the first method for the MAC CE design becomes an effective method.

FIG. 2H is a diagram explaining the whole operation in a multi-shot CSI-RS mode according to an embodiment of the disclosure.

A UE 2h-01 receives system information at operation 2h-05 from an eNB 2h-03, and performs an RRC connection at operation 2h-10. Thereafter, the UE receives an RRC message for configuring a CSI-RS resource from the eNB at operation 2h-15. The CSI-RS configuration includes an index of the existing CSI-RS configuration, the number of antenna ports included in the CSI-RS, a transmission cycle of the CSI-RS, transmission offset, CSI-RS resource configuration, CSI-RS scrambling ID, and QCL information. Further, the CSI-RS configuration may include an indication indicating that the CSI-RS configuration is for the multi-shot CSI-RS. For the CSI-RS configuration through the RRC message, the following methods may be used to discriminate different configurations.

1. A method in which identification information indicating multi-shot CSI-RS and aperiodic CSI-RS is included in the existing CSI-RS config IE. If the aperiodic CSI-RS is indicated, subframe config information configured in the CSI-RS config IE is not used.
2. A method in which identification information indicating multi-shot CSI-RS is included in the existing CSI-RS config IE, and a new aperiodic CSI-RS config IE for the aperiodic CSI-RS is additionally introduced. The subframe config information is not included in the aperiodic CSI-RS config IE.
3. A method in which a new CSI-RS config IE is additionally introduced in addition to the existing CSI-RS config IE. An identification for discriminating between the multi-shot CSI-RS and aperiodic CSI-RS config IE is included in the new CSI-RS config IE, and if the aperiodic CSI-RS is indicated, the subframe config information configured in the CSI-RS config IE is not used.

Thereafter, the eNB indicates what resource among CSI-RS resources configured through a MAC CE is actually activated at operation 2h-20. As described above with reference to FIG. 2C, the CSI-RS s may be transmitted using a part of 1 to 8 indicated locations in accordance with the number of antennas for transmitting the CSI-RSs. If a CSI-RS activation resource is indicated through the MAC CE, the UE performs a CSI-RS activation (CSI-RS reception) at operation 2h-25 after X ms (e.g., 8 ms). That is, since the UE proceeds with the corresponding operation after X ms from the time when the MAC CE is successfully received, the MAC transfers time information on reception of the MAC CE (subframe number during reception of the MAC CE) to a physical layer, prepares CSI-RS configuration, such as configured antenna ports and subframe configuration, prepares for interference measurement, and prepares reporting of the CSI-RS measurement value in accordance with a CSI-RS report method determined by the eNB. As the report method, a periodic or aperiodic report becomes possible. At operation 2h-30, the UE receives the CSI-RS from the eNB in accordance with a predetermined cycle. Thereafter, the UE receives CSI-RS deactivation through the MAC CE at operation 2h-35, and the MAC transfers time information (subframe number during reception of the MAC CE) when the MAC CE is received to the physical layer. Further, the UE deactivates the CSI-RS reception and CSI-RS report after Y ms (e.g., 8 ms) elapses from the reception time at operation 2h-40. If the CSI-RS is received for Y ms, the above-described information is valid.

Figure 2I:
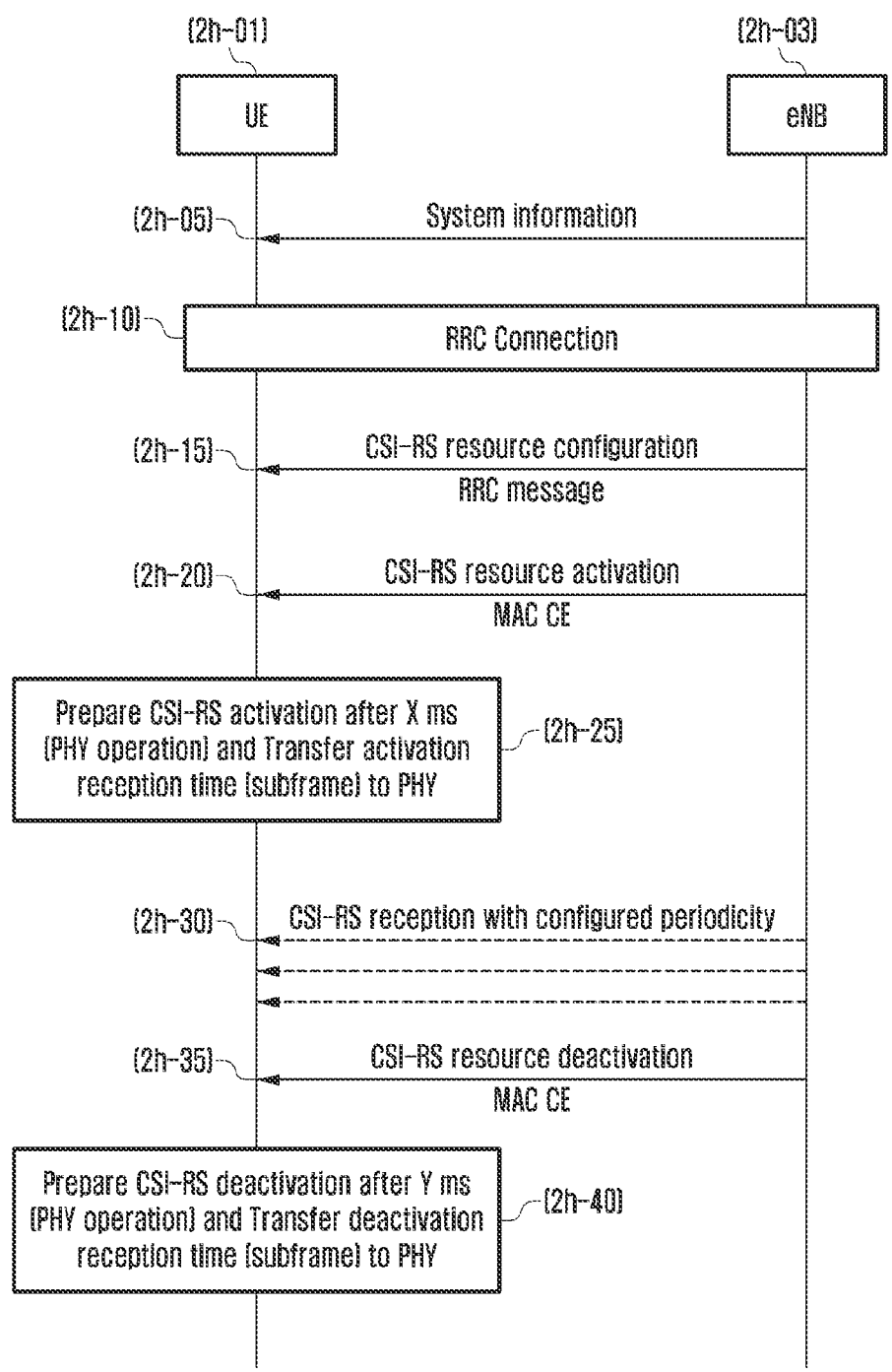
FIG. 2I is a diagram explaining the whole operation in an aperiodic CSI-RS mode according to an embodiment of the disclosure.
Figure 21:
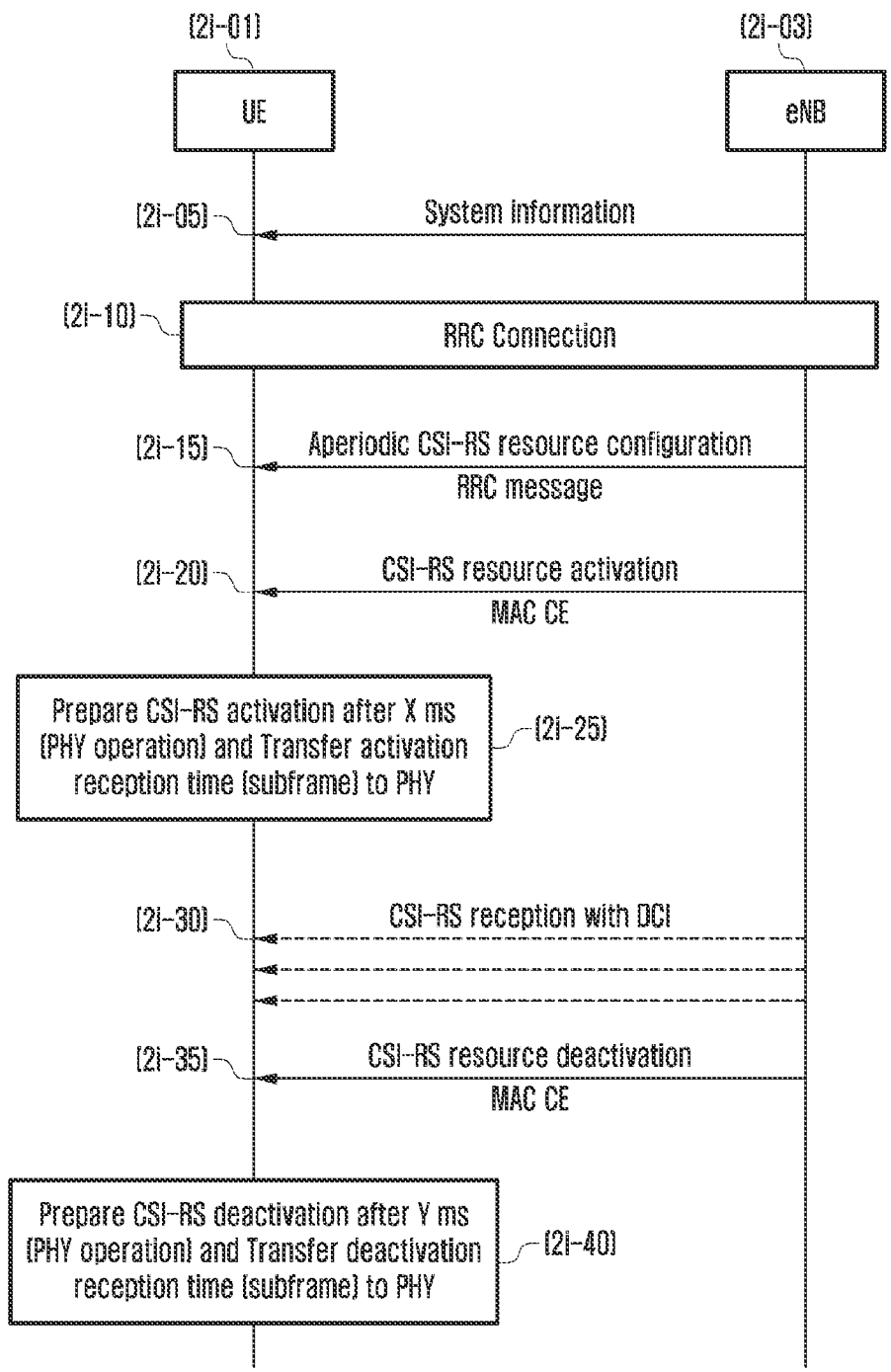

FIG. 2I is a diagram explaining the whole operation in an aperiodic CSI-RS mode according to an embodiment of the disclosure.

A UE 2i-01 receives system information at operation 2i-05 from an eNB 2i-03, and performs an RRC connection at operation 2i-10. Thereafter, the UE receives an RRC message for configuring a CSI-RS resource from the eNB at operation 2i-15. The CSI-RS configuration may or may not include the existing subframe config information, and may include an indication indicating that the CSI-RS configuration is for the aperiodic CSI-RS. Further, the CSI-RS configuration may include an indication indicating that the CSI-RS configuration is for the aperiodic CSI-RS, and for the CSI-RS configuration through the RRC message, the following methods may be used to discriminate different configurations.
1. A method in which identification information indicating multi-shot CSI-RS and aperiodic CSI-RS is included in the existing CSI-RS config IE. If the aperiodic CSI-RS is indicated, subframe config information configured in the CSI-RS config IE is not used.
2. A method in which identification information indicating multi-shot CSI-RS is included in the existing CSI-RS config IE, and a new aperiodic CSI-RS config IE for the aperiodic CSI-RS is additionally introduced. The subframe config information is not included in the aperiodic CSI-RS config IE.
3. A method in which a new CSI-RS config IE is additionally introduced in addition to the existing CSI-RS config IE. An identification for discriminating between the multi-shot CSI-RS and aperiodic CSI-RS config IE is included in the new CSI-RS config IE, and if the aperiodic CSI-RS is indicated, the subframe config information configured in the CSI-RS config IE is not used.

Thereafter, the eNB indicates what resource among CSI-RS resources configured through a MAC CE is actually activated at operation 2*i*-20. As described above with reference to FIG. 2C, the CSI-RS s may be transmitted using a part of 1 to 8 indicated locations in accordance with the number of antennas for transmitting the CSI-RSs. If a CSI-RS activation resource is indicated through the MAC CE, the UE performs a CSI-RS activation (CSI-RS reception) at operation 2*i*-25 after X ms (e.g., 8 ms). That is, since the UE proceeds with the corresponding operation after X ms from the time when the MAC CE is successfully received, the MAC transfers time information on reception of the MAC CE (subframe number during reception of the MAC CE) to a physical layer, monitors CSI-RS reception in a subframe receiving a DCI at operation 2*i*-30, prepares for interference measurement, and prepares reporting of the CSI-RS measurement value in accordance with a CSI-RS report method determined by the eNB. As the report method, an aperiodic report becomes possible. Thereafter, the UE receives CSI-RS deactivation through the MAC CE at operation 2*i*-35, and the MAC transfers time information (subframe number during reception of the MAC CE) when the MAC CE is received to the physical layer. Further, the UE deactivates the CSI-RS reception and CSI-RS report after Y ms (e.g., 8 ms) elapses from the reception time at operation 2*i*-40. If the CSI-RS is received for Y ms, the above-described information is valid.

FIG. 2J is a diagram explaining the whole terminal operation for CSI-RS activation/deactivation using a MAC CE according to an embodiment of the disclosure.

A UE in an RRC connection state receives a CSI-RS configuration from an eNB at operation 2*j*-05. In accordance with the kind of the CSI-RS configuration, the eNB has a different CSI-RS resource and transmission operation, and thus the operation of the UE also differs. Further, the configured aperiodic/multi-shot CSI-RS resources may be initialized to a deactivation state after the initial configuration and handover. For the CSI-RS configuration through the RRC message, the following methods may be used to discriminate different configurations.
1. A method in which identification information indicating multi-shot CSI-RS and aperiodic CSI-RS is included in the existing CSI-RS config IE. If the aperiodic CSI-RS is indicated, subframe config information configured in the CSI-RS config IE is not used.
2. A method in which identification information indicating multi-shot CSI-RS is included in the existing CSI-RS config IE, and a new aperiodic CSI-RS config IE for the aperiodic CSI-RS is additionally introduced. The subframe config information is not included in the aperiodic CSI-RS config IE.
3. A method in which a new CSI-RS config IE is additionally introduced in addition to the existing CSI-RS config IE. An identification for discriminating between the multi-shot CSI-RS and aperiodic CSI-RS config IE is included in the new CSI-RS config IE, and if the aperiodic CSI-RS is indicated, the subframe config information configured in the CSI-RS config IE is not used.

At operation 2*j*-10, the UE analyzes CSI-RS configuration information received from an eNB to determine the type thereof. Type 1 corresponds to the existing periodic CSI-RS reception operation at operation 2*j*-15, and this can be discriminated based on an identification method according to the above-described CSI-RS config method.

If the UE analyzes the CSI-RS configuration information received from the eNB and determines a type 2 operation at operation 2*j*-10, the UE performs the operation in FIG. 2H. That is, the UE performs the operation in a multi-shot CSI-RS mode. That is, the UE receives what resource among CSI-RS resources configured through a MAC CE is actually activated at operation 2*j*-20. Since the UE proceeds with the corresponding operation after X ms from the time when the MAC CE is successfully received, the MAC transfers time information on reception of the MAC CE (subframe number during reception of the MAC CE) to a physical layer at operation 2*j*-25, prepares CSI-RS configuration, such as a configured antenna port and subframe configuration, prepares for interference measurement, and prepares reporting of the CSI-RS measurement value in accordance with a CSI-RS report method determined by the eNB at operation 2*j*-30. At operation 2*j*-35, the UE receives the CSI-RS from the eNB in accordance with a predetermined cycle, and reports the measurement value to the eNB. As the report method, a periodic or aperiodic report becomes possible. Thereafter, the UE receives CSI-RS deactivation through the MAC CE at operation 2*j*-40, and the MAC transfers time information (subframe number during reception of the MAC CE) when the MAC CE is received to the physical layer at operation 2*j*-45. Further, the UE deactivates the CSI-RS reception and CSI-RS report after Y ms (e.g., 8 ms) elapses from the reception time at operation 2*j*-50. If the CSI-RS is received for Y ms, the above-described information is valid.

If the UE analyzes the CSI-RS configuration information received from the eNB and determines a type 3 operation at operation 2*j*-10, the UE performs the operation in FIG. 2I. That is, the UE performs the operation in an aperiodic CSI-RS mode. That is, the UE identifies what resource among CSI-RS resources configured through reception of a MAC CE is actually activated at operation 2*j*-55. If the CSI-RS activation resource is indicated through the MAC CE, the UE performs a CSI-RS activation (CSI-RS reception) after X ms (e.g., 8 ms). That is, since the UE proceeds with the corresponding operation after X ms from the time when the MAC CE is successfully received, the MAC transfers time information on reception of the MAC CE (subframe number during reception of the MAC CE) to a physical layer at operation 2*j*-60, prepares for interference measurement, prepares reporting of the CSI-RS measurement value in accordance with a CSI-RS report method determined by the eNB at operation 2*j*-65, and monitors CSI-RS reception in the subframe receiving the DCI at operation 2*j*-70. At operation 2*j*-35, the UE receives the CSI-RS from the eNB in accordance with a predetermined cycle, and reports the measurement value to the eNB. As the report method, an aperiodic report becomes possible. Thereafter, the UE receives CSI-RS deactivation through the MAC CE at operation 2*j*-75, and the MAC transfers time information (subframe number during reception of the MAC CE) when the MAC CE is received to the physical layer at operation 2*j*-80. Further, the UE deactivates the CSI-RS reception and CSI-RS report after Y ms (e.g., 8 ms) elapses from the reception time at operation 2*j*-85. If the CSI-RS is received for Y ms, the above-described information is valid.

Figure 2K:
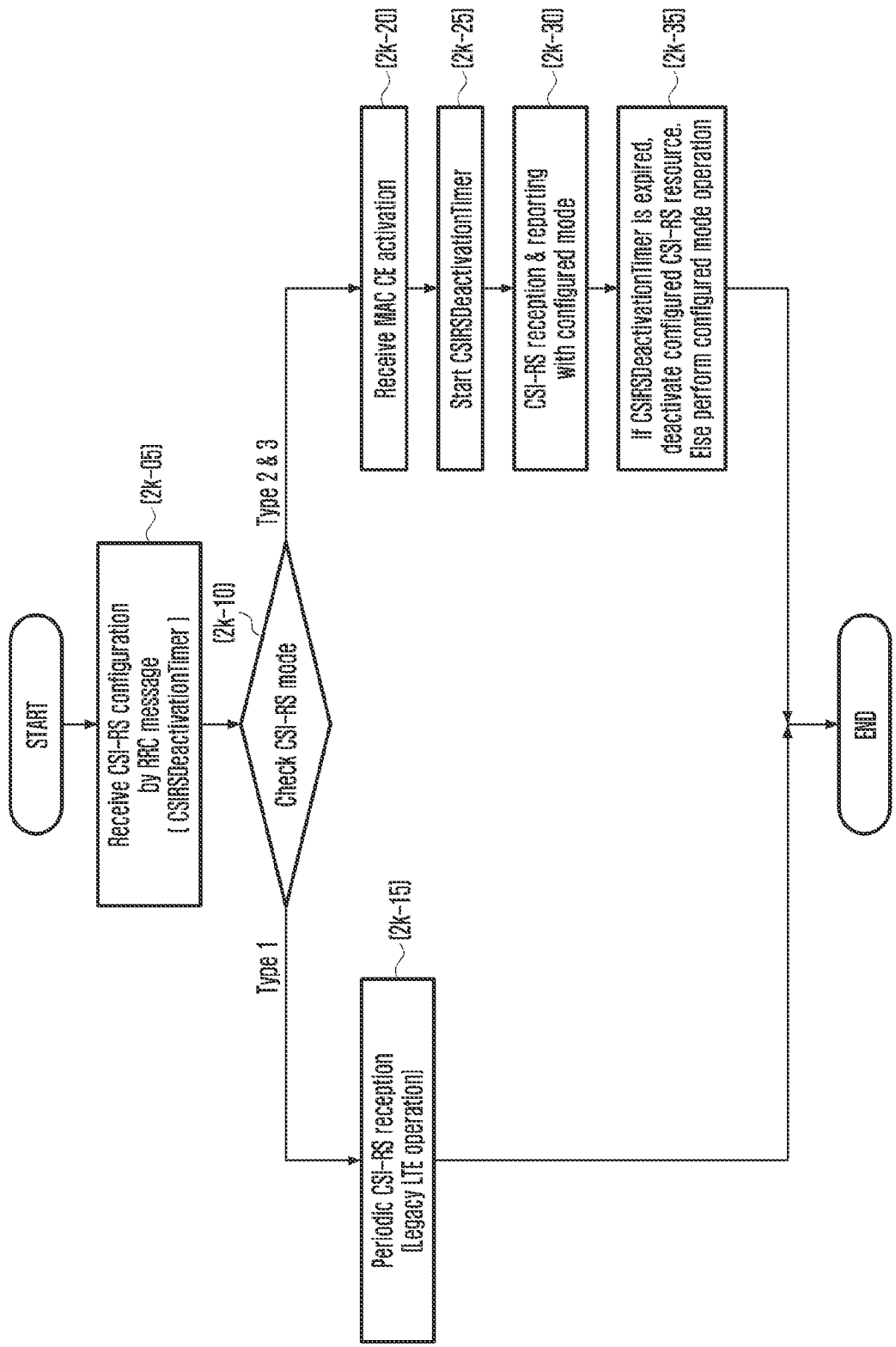
FIG. 2K is a diagram illustrating a method in which a counter is used for CSI-RS activation/deactivation operations using a MAC CE proposed according to an embodiment of the disclosure.

FIG. 2K is a diagram illustrating a method in which a counter is used for CSI-RS activation/deactivation operations using a MAC CE according to an embodiment of the disclosure.

As another embodiment in which the UE performs the whole operation in FIG. 2J, an operation when a timer such as sCellDeactivationTimer is introduced may be embodied. The UE in an RRC connection state receives a CSI-RS configuration from an eNB at operation 2*k*-05. In accordance with the kind of the CSI-RS configuration, the eNB has a different CSI-RS resource and transmission operation, and thus the operation of the UE also differs. At operation 2*k*-10, the UE analyzes CSI-RS configuration information received from the eNB to determine the type thereof. Type 1 corresponds to the existing periodic CSI-RS reception operation at operation 2*k*-15, and this can be discriminated based on an identification method according to the above-described CSI-RS config method. If type 2 or 3 operation is identified through the CSI-RS configuration information, the UE may identify activated CSI-RS resource through reception of the MAC CE at operation 2*k*-20. At the above-described time, that is, if the MAC CE is received, the UE starts CSIRS-DeactivationTimer at operation 2*k*-25. That is, CSIRSDeactivationTimer is driven for each cell in which the CSI-RS resource is configured or the CSI process is configured (or driven for each CSI process) at operation 2*k*-30, the start/restart is performed at a time when the MAC CE activating the corresponding resource is received, and if the timer expires, the corresponding resource is deactivated at operation 2*k*-35. Further, the timer may be managed for each CSI-RS resource.

Figure 2L:
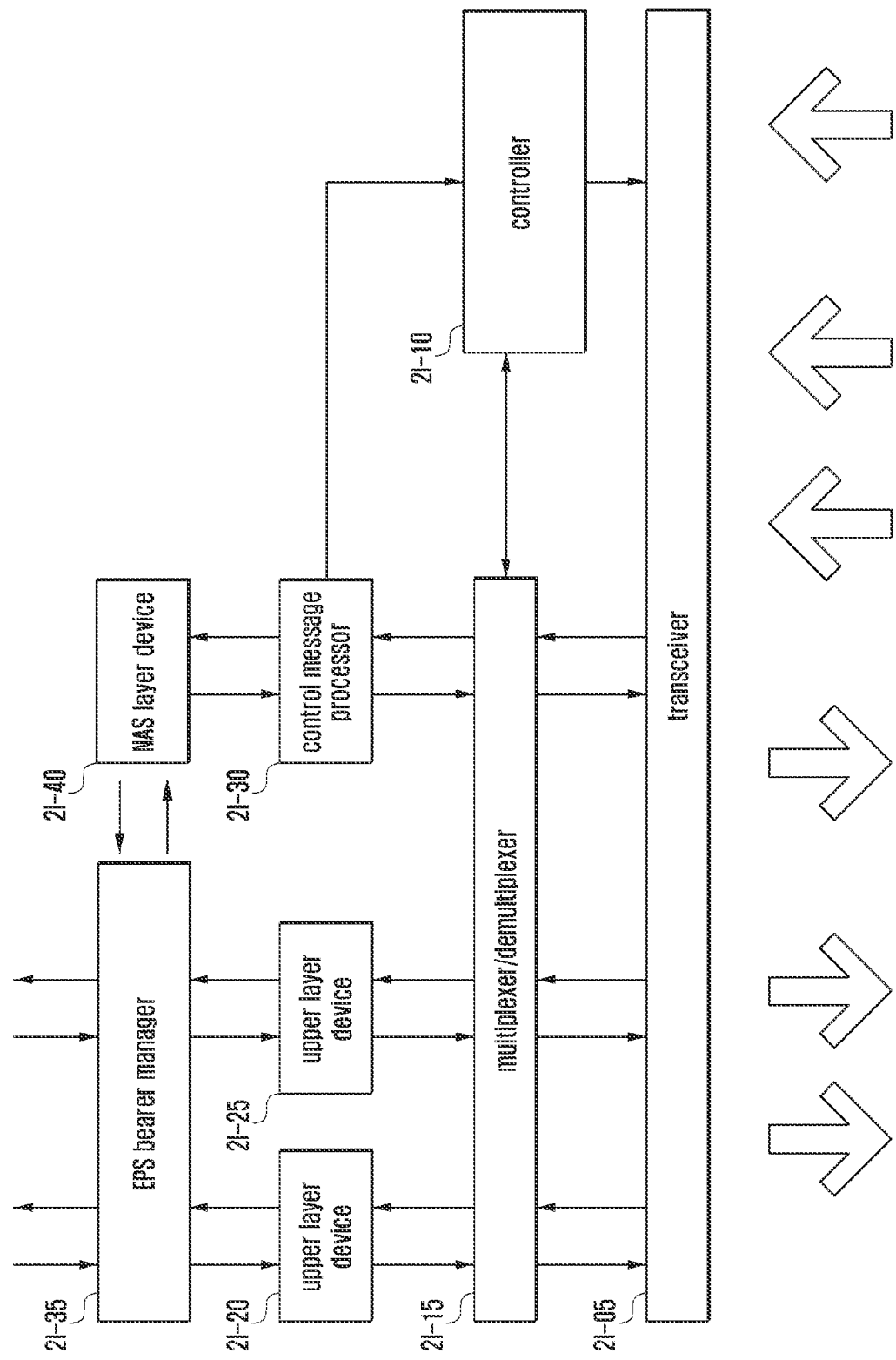
FIG. 2L is a block diagram illustrating the configuration of a terminal according to an embodiment of the disclosure.

FIG. 2L is a block diagram illustrating the configuration of a terminal according to an embodiment of the disclosure.

Referring to FIG. 2L, a terminal according to an embodiment of the disclosure includes a transceiver 2*l*-05, a controller 2*l*-10, a multiplexer/demultiplexer 2*l*-15, a control message processor 2*l*-30, various kinds of upper layer processors 2*l*-20 and 2*l*-25, an EPS bearer manager 2*l*-35, and a NAS layer device 2*l*-40.

The transceiver 2*l*-05 receives data and a specific control signal on a forward channel of a serving cell, and transits the data and the specific control signal on a backward channel. If a plurality of serving cells are configured, the transceiver 2*l*-05 performs data transmission/reception and control signal transmission/reception through the plurality of serving cells.

The multiplexer/demultiplexer 2*l*-15 serves to multiplex data generated by the upper layer processors 2*l*-20 and 2*l*-25 or the control message processor 2*l*-30, to demultiplex the data received through the transceiver 2*l*-05, and to transfer the multiplexed or demultiplexed data properly to the upper layer processors 2*l*-20 and 2*l*-25 or the control message processor 2*l*-30.

The control message processor 2*l*-30 is an RRC layer device, and takes a necessary operation through processing a control message received from a base station. For example, if an RRC CONNECTION SETUP message is received, the control message processor sets an SRB and a temporary DRB.

The upper layer processor 2*l*-20 or 2*l*-25 means a DRB device, and may be configured for each service. The upper layer processor processes data generated through a user service, such as a file transfer protocol (FTP) or VoIP, and transfers the processed data to the multiplexer/demultiplexer 2*l*-15, or processes data transferred from the multiplexer/demultiplexer 2*l*-15 and transfers the processed data to a service application of an upper layer. One service may be mapped onto one EPS bearer and one upper layer processor in a one-to-one manner.

The controller 2*l*-10 controls the transceiver 2*l*-05 and the multiplexer/demultiplexer 2*l*-15 to identify scheduling commands, for example, backward grants, received through the transceiver 2*l*-05 and to perform backward transfer thereof as proper transfer resources at proper time. Further, the controller 2*l*-10 may measure at least one reference signal received through the transceiver 2*l*-05, and may generate feedback information in accordance with the feedback configuration information. Further, the controller 2*l*-10 may control the transceiver 2*l*-05 to transmit the generated feedback information to the base station in the feedback timing according to the feedback configuration information. Further, the controller 2*l*-10 may receive a CSI-RS from the base station, generate the feedback information based on the received CSI-RS, and transmit the generated feedback information to the base station. In this case, the controller 2*l*-10 may select a precoding matrix for each antenna port group of the base station, and may further select one additional precoding matrix based on relationships between antenna port groups of the base station.

Further, the controller 2*l*-10 may receive the CSI-RS from the base station, generate the feedback information based on the received CSI-RS, and transmit the generated feedback information to the base station. In this case, the controller 2*l*-10 may select a precoding matrix for all antenna port groups of the base station. Further, the controller 2*l*-10 may receive feedback configuration information from the base station, receive the CSI-RS from the base station, generate the feedback information based on the received feedback configuration information and the received CSI-RS, and transmit the generated feedback information to the base station. In this case, the controller may receive additional feedback configuration information based on the relationships between the feedback configuration information corresponding to each antenna port group of the base station and the antenna port group.

Figure 2M:
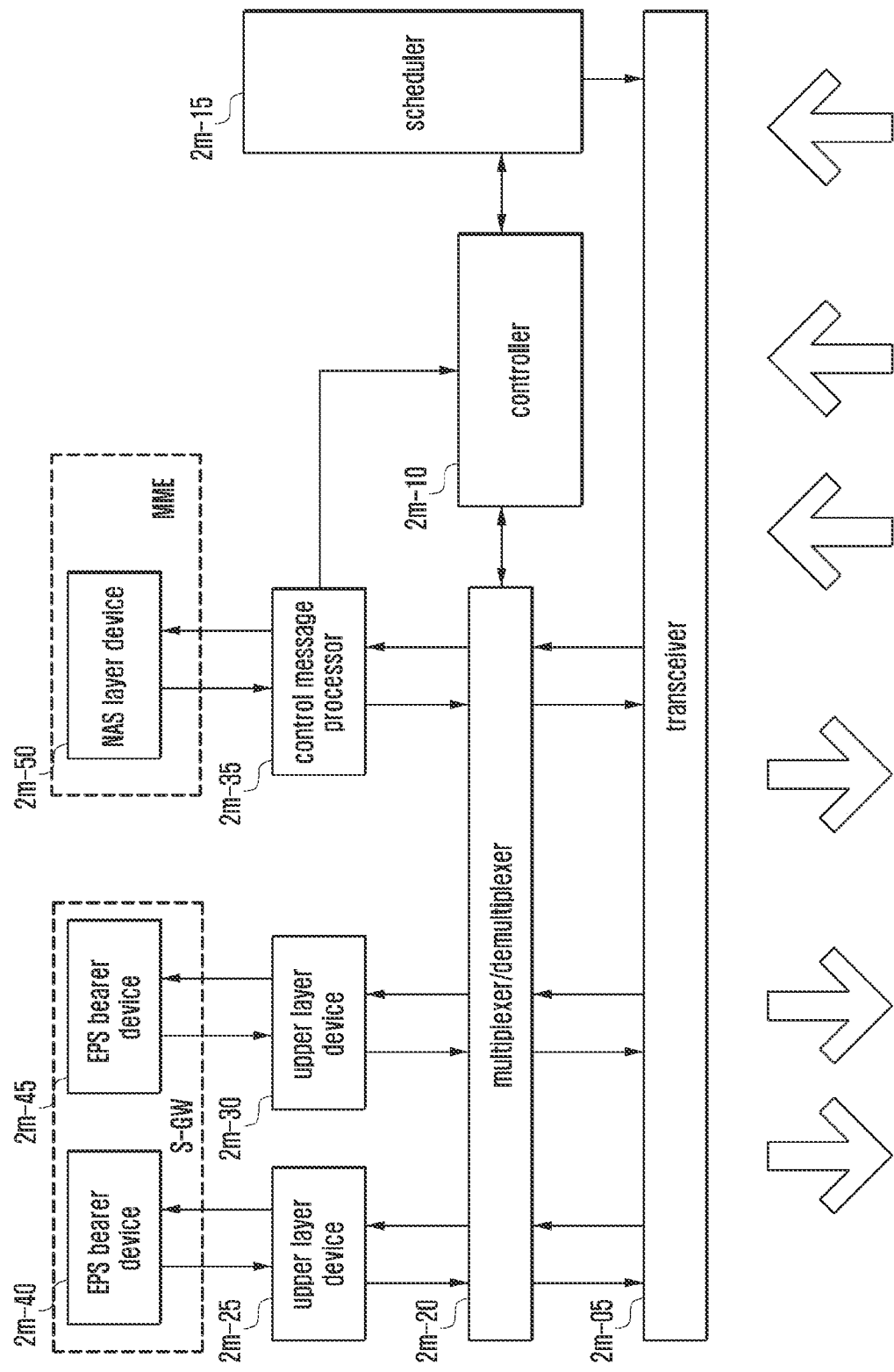
FIG. 2M is a block diagram illustrating the configurations of a base station, mobility management entity (MME), and serving gateway (S-GW) according to an embodiment of the disclosure.

FIG. 2M is a block diagram illustrating the configurations of a base station, an MME, and an S-GW according to an embodiment of the disclosure.

A base station device of FIG. 2M includes a transceiver 2*m*-05, a controller 2*m*-10, a multiplexer/demultiplexer 2*m*-20, a control message processor 2*m*-35, various kinds of upper layer processors 2*m*-25 and 2*m*-30, a scheduler 2*m*-15, EPS bearer devices 2*m*-40 and 2*m*-45, and a NAS layer device 2*m*-50. The EPS bearer device is located in the S-GW, and the NAS layer device is located in the MME.

The transceiver 2*m*-05 transmits data and a specific control signal on a forward carrier, and receives the data and the specific control signal on a backward carrier. If a plurality of carriers are configured, the transceiver 2*m*-05 performs data transmission/reception and control signal transmission/reception on the plurality of carriers.

The multiplexer/demultiplexer 2m-20 serves to multiplex data generated by the upper layer processors 2m-25 and 2m-30 or the control message processor 2m-35, to demultiplex the data received through the transceiver 2m-05, and to transfer the multiplexed or demultiplexed data properly to the upper layer processors 2m-25 and 2m-30, the control message processor 2m-35, or the controller 2m-10. The control message processor 2m-35 may take a necessary operation through processing of the control message transmitted by the terminal, or generate the control message to be transferred to the terminal to transfer the generated control message to a lower layer.

The upper layer processor 2m-25 or 2m-30 may be configured for each EPS bearer, and configures the data transferred from the EPS bearer device as an RLC PDU to transfer the configured RLC PDU to the multiplexer/demultiplexer 2m-20 or configures the RLC PDU transferred from the multiplexer/demultiplexer 2m-20 as a PDCP SDU to transfer the configured PDCP SDU to the EPS bearer device.

The scheduler allocates a transfer resource to the terminal at a proper time in consideration of a buffer state and a channel state of the terminal, and controls the transceiver to process a signal transmitted by the terminal or to transmit the signal to the terminal.

The EPS bearer device is configured for each EPS bearer, and processes data transferred from the upper layer processor to transfer the processed data to a next network node.

The upper layer processor and the EPS bearer device are mutually connected by an S1-U bearer. The upper layer processor corresponding to a common DRB is connected by the EPS bearer for the common DRB and a common S1-U bearer.

The NAS layer device processes an IP packet accommodated in a NAS message to transfer the processed IP packet to the S-GW.

Further, the controller 2m-10 controls the state and operation of all configurations constituting the base station. Specifically, the controller 2m-10 allocates CSI-RS resources for channel estimation of the terminal to the terminal, and allocates feedback resources and feedback timing to the terminal. Further, the controller allocates feedback configuration and feedback timing to prevent collision of the feedback from several terminals, and receives and analyzes the configured feedback information in the corresponding timing. The transceiver 2m-05 transmits/receives data, a reference signal, and feedback information to/from the terminal. Here, the transceiver 2m-05 transmits an aperiodic CSI-RS to the terminal through the allocated resource under the control of the controller 2m-10, and receives a feedback of channel information from the terminal. The controller 2m-10 may control the transceiver 2m-05 to transmit configuration information of at least one reference signal to the terminal, or may generate the at least one reference signal. Further, the controller 2m-10 may control the transceiver 2m-05 to transmit the feedback configuration information for generating the feedback information according to the result of measurement to the terminal. Further, the controller 2m-10 may control the transceiver 2m-05 to transmit the at least one reference signal to the terminal and to receive the feedback information transmitted from the terminal in the feedback timing according to the feedback configuration information. Further, the controller 2m-10 may transmit the feedback configuration information to the terminal, transmit the aperiodic CSI-RS to the terminal, and receive the feedback information generated based on the feedback configuration information and the CSI-RS from the terminal. In this case, the controller 2m-10 may transmit additional feedback configuration information based on the relationships between the feedback configuration information corresponding to each antenna port group of the base station and the antenna port group. Further, the controller 2m-10 may transmit the CSI-RS beamformed based on the feedback information to the terminal, and may receive the feedback information generated based on the CSI-RS from the terminal.

The disclosure has the following claim rights.

A method and an apparatus for CSI-RS activation/deactivation using a MAC control signal Configuration of multi-shot CSI-RS resources and aperiodic CSI-RS resources and activation/deactivation operations Division of three kinds of operations (periodic CCSI-RS, aperiodic CSI-RS, and multi-shot CSI-RS) in accordance with the kinds of identification included in an RRC message and a CSI-RS config IE in the RRC message A MAC does not directly perform an operation indicated in a MAC CE, but transfers only related information to a PHY (since the corresponding operation is performed after 8 ms from time when the MAC CE is successfully received, the time information is transferred).

Determination of a format based on an index of a serving cell in which a CSI-RS resource is configured or a CSI process is configured Two design methods in accordance with a signal structure of a MAC CE are proposed.

A first method for a MAC CE design in which one MAC CE transmitted by a base station includes activation/deactivation command for all serving cells In the first method, a Ci field indicates a serving cell having a configured CSI-RS resource.

In the first method, a CSI-RS command is indicated only with respect to activated serving cells.

A second method for a MAC CE design in which one MAC CE includes only an activation/deactivation command for a corresponding serving cell In the second method, a MAC CE includes a command for a serving cell in which a MAC CE is received. A CSI-RS is activated/deactivated only with respect to a corresponding serving cell.

The number of activated/deactivated resources in a CSI-RS command is equal to the number of CSI-RS processes configured for serving cells.

Ri corresponds to CSI-RS-ConfigNZPId.

Timer such as sCellDeactivationTimer

CSIRSDeactivationTimer is driven for each cell in which a CSI-RS resource is configured or a CSI process is configured (or for each CSI process)

Start/restart corresponds to a time when a MAC CE activating a corresponding resource is received.

If a timer expires, a corresponding resource is deactivated.

Management of a timer for each CSI-RS resource is possible.

Set aperiodic/multi-shot CSI-RS resources are initially deactivated after configuration and handover.

On the other hand, embodiments of the disclosure described in the specification and drawings are merely specific examples presented to help understanding of the disclosure, and are not intended to limit the scope of the disclosure. That is, it will be apparent to those of ordinary skill in the art to which the disclosure pertains that various modifications can be realized based on the technical concept of the disclosure. Further, respective embodiments may be combined to be operated as needed. For example, parts of embodiments of the disclosure may be combined to operate a base station and a terminal. Further, although the above-described embodiments are presented based on an NR system, other modifications based on the technical concept of the embodiments can be applied to other systems, such as frequency division duplex (FDD) or time division duplex (TDD) LTE systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a transmitting device in a wireless communication system, the method comprising:
    identifying, by a packet data convergence protocol (PDCP) layer, that a header of an upper layer performing a quality of service (QOS) flow mapping is attached in a PDCP service data unit (SDU), based on at least one of an indication or a connection with a 5G core network;
    obtaining, by the PDCP layer from the upper layer performing the QoS flow mapping, the PDCP SDU comprising the header of the upper layer performing the QoS flow mapping and data;
    removing, by the PDCP layer, at least one byte corresponding to the header of the upper layer performing the QoS flow mapping from the PDCP SDU, and performing, by the PDCP layer, a ciphering for the data except for the header of the upper layer performing the QoS flow mapping; and
    submitting, by the PDCP layer to a lower layer, a PDCP protocol data unit (PDU) including a PDCP header, the header of the upper layer performing the QoS flow mapping which is not ciphered, and a ciphered data,
    wherein a QoS flow identity (ID) is marked into the header of the upper layer performing the QoS flow mapping by the upper layer.

2. The method of claim 1, wherein the header of the upper layer performing the QoS flow mapping is present for the data of a data radio bearer (DRB) based on a configuration.

3. The method of claim 1, wherein the performing further comprises:
    performing a header compression for the at least one byte corresponding to a header of the data;
    performing the ciphering for the data including the header of the data the header compression performed; and
    adding the at least one byte corresponding to the header of the upper layer performing the QoS flow mapping to a result of the ciphering.

4. The method of claim 1, wherein the upper layer performing the QoS flow mapping performs mapping between the QoS flow and a DRB.

5. A method performed by a receiving device in a wireless communication system, the method comprising:
    identifying, by a packet data convergence protocol (PDCP) layer, that a header of an upper layer performing a quality of service (QOS) flow mapping is attached in a PDCP service data unit (SDU), based on at least one of an indication or a connection with a 5G core network;
    obtaining, by the PDCP layer from a lower layer, a PDCP protocol data unit (PDU) including a PDCP header, the header of the upper layer performing the QoS flow mapping which is not ciphered, and a ciphered data;
    obtaining, by the PDCP layer, the PDCP SDU by removing the PDCP header from the PDCP PDU, removing, by the PDCP layer, at least one byte corresponding to the header of the upper layer performing the QoS flow mapping from the PDCP SDU, and performing, by the PDCP layer, a deciphering for the ciphered data except for the header of the upper layer performing the QoS flow mapping; and
    delivering, by the PDCP layer to the upper layer performing the QoS flow mapping, the PDCP SDU comprising the header of the upper layer performing the QoS flow mapping and a deciphered data,
    wherein a QoS flow identity (ID) is marked into the header of the upper layer performing the QoS flow mapping by the upper layer.

6. The method of claim 5, wherein the header of the upper layer performing the QoS flow mapping is present for the data of a data radio bearer (DRB) based on a configuration.

7. The method of claim 5,
    wherein a header decompression for at least one byte corresponding to a header of the data is performed.

8. The method of claim 5, wherein the upper layer performing the QoS flow mapping performs mapping between the QoS flow and a DRB.

9. A transmitting device in a wireless communication system, the transmitting device comprising:
    a transceiver; and
    a controller configured to:
        identify, by a packet data convergence protocol (PDCP) layer, that a header of an upper layer performing a quality of service (QOS) flow mapping is attached in a PDCP service data unit (SDU), based on at least one of an indication or a connection with a 5G core network,
        obtain, by the PDCP layer from the upper layer performing the QoS flow mapping, the PDCP SDU comprising the header of the upper layer performing the QoS flow mapping and data,
        remove, by the PDCP layer, at least one byte corresponding to the header of the upper layer performing the QoS flow mapping from the PDCP SDU, and perform, by the PDCP layer, a ciphering for the data except for the header of the upper layer performing the QoS flow mapping, and
        submit, by the PDCP layer to a lower layer, a PDCP protocol data unit (PDU) including a PDCP header, the header of the upper layer performing the QoS flow mapping which is not ciphered, and a ciphered data,
    wherein a QoS flow identity (ID) is marked into the header of the upper layer performing the QoS flow mapping by the upper layer.

10. The transmitting device of claim 9, wherein the header of the upper layer performing the QoS flow mapping is present for the data of a data radio bearer (DRB) based on a configuration.

11. The transmitting device of claim 9, wherein the controller is further configured to:
    perform a header compression for at least one byte corresponding to a header of the data,
    perform the ciphering for the data including the header of the data the header compression performed, and
    add the at least one byte corresponding to the header of the upper layer performing the QOS flow mapping to a result of the ciphering.

12. The transmitting device of claim 9, wherein the upper layer performing the QoS flow mapping performs mapping between the QoS flow and a DRB.

13. A receiving device in a wireless communication system, the receiving device comprising:
a transceiver; and
a controller configured to:
identify, by a packet data convergence protocol (PDCP) layer, that a header of an upper layer performing a quality of service (QOS) flow mapping is attached in a PDCP service data unit (SDU), based on at least one of an indication or a connection with a 5G core network,
obtain, by the PDCP layer from a lower layer, a PDCP protocol data unit (PDU) including a PDCP header, the header of the upper layer performing the QoS flow mapping which is not ciphered, and a ciphered data,
obtain, by the PDCP layer, the PDCP SDU by removing the PDCP header from the PDCP PDU, remove, by the PDCP layer, at least one byte corresponding to the header of the upper layer performing the QoS flow mapping from the PDCP SDU, and perform, by the PDCP layer, a deciphering for the ciphered data except for the header of the upper layer performing the QoS flow mapping, and
deliver, by the PDCP layer to the upper layer performing the QoS flow mapping, the PDCP SDU comprising the header of the upper layer performing the QoS flow mapping and a deciphered data,
wherein a QoS flow identity (ID) is marked into the header of the upper layer performing the QoS flow mapping by the upper layer.

14. The receiving device of claim 13, wherein the header of the upper layer performing the QoS flow mapping is present for the data of a data radio bearer (DRB) based on a configuration.

15. The receiving device of claim 13, wherein
a header decompression for at least one byte corresponding to a header of the data is performed.

16. The receiving device of claim 13, wherein the upper layer performing the QoS flow mapping performs mapping between the QoS flow and a DRB.

* * * * *